(12) United States Patent
Nakada et al.

(10) Patent No.: US 8,394,899 B2
(45) Date of Patent: *Mar. 12, 2013

(54) FINE PARTICLE-DISPERSED POLYOL COMPOSITION, METHOD FOR PRODUCING POLYMER POLYOL, AND METHOD FOR PRODUCING POLYURETHANE RESIN

(75) Inventors: Shigekuni Nakada, Kyoto (JP); Hiroyuki Watanabe, Kyoto (JP); Takayuki Tsuji, Kyoto (JP); Hiroki Mori, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/210,992

(22) Filed: Aug. 16, 2011

(65) Prior Publication Data

US 2011/0301257 A1 Dec. 8, 2011

Related U.S. Application Data

(62) Division of application No. 11/922,512, filed as application No. PCT/JP2006/313312 on Jul. 4, 2006, now abandoned.

(30) Foreign Application Priority Data

Jul. 7, 2005 (JP) .................................. 2005-199417
Dec. 22, 2005 (JP) .................................. 2005-370953

(51) Int. Cl.
*C08F 283/06* (2006.01)
(52) U.S. Cl. ........ 525/404; 525/185; 525/231; 525/238; 525/412; 525/539; 252/182.24; 252/182.27
(58) Field of Classification Search .................. 525/404, 525/412, 185, 231, 238, 539; 252/182.24; 252/182.26
See application file for complete search history.

(56) References Cited

U.S. PATENT DOCUMENTS

| | | | |
|---|---|---|---|
| 3,383,351 | A | 5/1968 | Stamberger |
| 4,192,928 | A | 3/1980 | Tanaka et al. |
| 4,226,756 | A | 10/1980 | Critchfield et al. |
| 4,230,823 | A | 10/1980 | Alberts et al. |
| 4,723,026 | A | 2/1988 | Cloetens et al. |
| 5,021,506 | A | 6/1991 | Gastinger et al. |
| 5,171,759 | A | 12/1992 | Hager |
| 5,196,476 | A | 3/1993 | Simroth |
| 5,488,085 | A | 1/1996 | Hayes et al. |
| 5,494,957 | A | 2/1996 | Moore et al. |
| 5,814,699 | A | 9/1998 | Kratz et al. |
| 6,624,209 | B2 | 9/2003 | Kawamoto et al. |
| 6,756,414 | B2 | 6/2004 | Kawamoto et al. |
| 2003/0004217 | A1 | 1/2003 | Kawamoto et al. |
| 2003/0181598 | A1 | 9/2003 | Heyman et al. |
| 2003/0216486 | A1 | 11/2003 | Kawamoto et al. |
| 2005/0245724 | A1 | 11/2005 | Horiguchi et al. |
| 2006/0025492 | A1 | 2/2006 | Chauk |
| 2006/0142441 | A1 | 6/2006 | Chan et al. |
| 2009/0018227 | A1 | 1/2009 | Nakada et al. |
| 2010/0036082 | A1 | 2/2010 | Nakada et al. |
| 2010/0210768 | A1 | 8/2010 | Nakada et al. |
| 2010/0222507 | A1 | 9/2010 | Nakada et al. |
| 2011/0301256 | A1 | 12/2011 | Nakada et al. |

FOREIGN PATENT DOCUMENTS

| | | |
|---|---|---|
| CN | 1312302 | 9/2001 |
| EP | 0 786 480 | 7/1997 |
| EP | 1 589 051 | 10/2005 |
| JP | 45-1474 | 1/1970 |
| JP | 53-85896 | 7/1978 |
| JP | 55-31880 | 3/1980 |
| JP | 62-36052 | 8/1987 |
| JP | 5-59134 | 3/1993 |
| JP | 5-148328 | 6/1993 |
| JP | 6-172462 | 6/1994 |
| JP | 7-196749 | 8/1995 |
| JP | 8-054752 | 2/1996 |
| JP | 8-067725 | 3/1996 |
| JP | 8-100006 | 4/1996 |
| JP | 8-333508 | 12/1996 |
| JP | 9-77968 | 3/1997 |
| JP | 9-124750 | 5/1997 |
| JP | 9-309937 | 12/1997 |
| JP | 10-195150 | 7/1998 |
| JP | 10-292018 | 11/1998 |
| JP | 11-130979 | 5/1999 |
| JP | 11-236499 | 8/1999 |
| JP | 2002-308920 | 10/2002 |
| JP | 2003-012706 | 1/2003 |
| JP | 2004-002800 | 1/2004 |
| JP | 2004-263192 | 9/2004 |
| JP | 2005-162791 | 6/2005 |
| JP | 2005-526155 | 9/2005 |
| JP | 2006-16611 | 1/2006 |
| JP | 2006-104236 | 4/2006 |
| JP | 2006-188685 | 7/2006 |
| JP | 2006-328261 | 12/2006 |
| JP | 2007-039677 | 2/2007 |
| JP | 2007-191682 | 8/2007 |
| WO | 01/09242 | 2/2001 |
| WO | 2007/007592 | 1/2007 |
| WO | WO2008/084625 | 7/2008 |
| WO | 2008/146614 | 12/2008 |

*Primary Examiner* — Michael L Leonard
(74) *Attorney, Agent, or Firm* — Hamre, Schumann, Mueller & Larson, P.C.

(57) ABSTRACT

A polyol composition comprising a polyol (a) and resin fine particles (b) dispersed in the polyol (a), and a method for producing the polyol composition are provided, wherein the resin fine particles (b) are particles such that an arithmetic standard deviation by volume of a particle size distribution of the particles, derived from respective values in 85 divisions of a range of 0.020 to 2000 μm determined by a laser diffraction/scattering particle size distribution analyzer, is not more than 0.6. A resin fine particle-dispersed polyol composition that, even if the resin particles dispersed in the polyol have a small particle diameter, allows the production of a polyurethane resin having an excellent mechanical strength such as elongation at break, and a method for producing the same, are provided.

6 Claims, No Drawings

FINE PARTICLE-DISPERSED POLYOL COMPOSITION, METHOD FOR PRODUCING POLYMER POLYOL, AND METHOD FOR PRODUCING POLYURETHANE RESIN

CROSS-REFERENCE TO RELATED APPLICATION

This application is a Division of application Ser. No. 11/922,512, filed Dec. 19, 2007 which is a U.S. National Stage of PCT/JP2006/313312, filed Jul. 4, 2006, which applications are incorporated herein by reference.

TECHNICAL FIELD

The present invention relates to a polyol composition containing fine particles of resin dispersed therein (hereinafter referred to as "resin fine particle-dispersed polyol composition"), and a method for producing the same. More specifically, the present invention relates to a polyol composition suitable as a material for a polyurethane resin such as a polyurethane foam and a polyurethane elastomer, a method for producing a polymer polyol, and a method for producing a polyurethane resin.

BACKGROUND ART

A polymer polyol is used as a material for a polyurethane resin for the purpose of improving properties, for example, compressive hardness and durability, of a polyurethane foam, and is obtained by polymerizing an ethylenically unsaturated monomer in a polyol in the presence of a polymerization initiator. In recent years, a polymer polyol having a small average particle diameter has been demanded for the purpose of further improving compressive hardness and elongation at break. Known methods to decrease the particle diameter include a method of increasing a ratio of acrylonitrile as a part of an ethylenically unsaturated monomer used, a method of using a modified polyol in which a part of hydroxyl groups have been allowed to react with a coupling agent (a silicon-containing compound, trialkoxyalkane, dialkoxyalkane, or the like) (see Patent Document 1), and a method of using a macromer containing unsaturated groups, having a high-molecular-weight part with a number-average molecular weight of 6,000 to 100,000 (see Patent Document 2). Further, another example is available, which is a method of using acrylonitrile at an increased ratio, the acrylonitrile being used as a part of an ethylenically unsaturated monomer used (see Patent Document 3). In this method, a seed dispersion composed of preliminarily formed submicron particles is prepared in polymerization in the first step, and a monomer is added to the seed dispersion in the second step so that a desired polymer concentration is obtained. Still further, a method of obtaining particles by using preliminarily-formed submicron particles as cores is known also (see Patent Document 4).
Patent Document 1: U.S. Pat. No. 4,723,026
  (corresponding Japanese publication: JP 61(1986)-246231 A)
Patent Document 2: U.S. Pat. No. 5,494,957
  (corresponding Japanese publication: JP 5(1993)-247109 A)
Patent Document 3: JP 6(1994)-172462 A
Patent Document 4: EP 786480
  (corresponding Japanese publication: JP 9(1997)-309937 A)

DISCLOSURE OF INVENTION

Problem to be Solved by the Invention

With the use of a polymer polyol obtained by any of the above-described Patent Documents 1 to 3, the following problems occur: scorching occurs if it is used for forming a slab foam; besides, an obtained polyurethane foam, particularly when a content of a polymer is increased, has insufficient mechanical strength typified by elongation at break, and is uneconomical since relatively expensive materials are used. Still further, in the case of the method according to Patent Document 4, the following problem occurs: because in order to obtain particles of a small diameter, a large amount of a so-called coupled polyol, which is a high-molecular-weight polyol obtained by coupling polyols with use of isocyanate, is used in a polyol that serves as a site in which polymerization occurs, the polymer polyol has a high viscosity, and an obtained polyurethane foam has insufficient elongation at break.

Means for Solving Problem

The inventors of the present invention have made earnest studies to solve the above-described problems. As a result, they found that the foregoing problems can be solved by setting a particle diameter distribution of resin fine particles dispersed in a polyol in a specific range, and performing a multi-stage polymerization process under specific conditions, as a polymerization method suitable for the production of the foregoing polyol composition. Thus, they arrived at the present invention.

More specifically, the present invention includes the following five aspects:

[1] A polyol composition (I) comprising a polyol (a) and resin fine particles (b) dispersed in the polyol (a), wherein the resin fine particles (b) are particles such that an arithmetic standard deviation by volume of a particle size distribution of the particles, derived from respective values in 85 divisions of a range of 0.020 to 2000 µm determined by a laser diffraction/scattering particle size distribution analyzer, is not more than 0.6

[2] A method for producing a polyurethane resin, comprising the step of causing a polyol component and an organic polyisocyanate to react, in the presence of one or more selected from a catalyst, a blowing agent, and a foam stabilizer as required, wherein the polyol composition (I) mentioned above is used as at least a part of the polyol component.

[3] A method for producing polymer polyol (Ia), the method comprising:
  a first step of polymerizing a monomer-containing mixture liquid (A1) comprising a polyol (a), an ethylenically unsaturated monomer (d), a radical polymerization initiator (k), and a dispersant (e), thereby obtaining a polymer polyol intermediate (B1); and
  a second step of polymerizing a monomer-containing mixture liquid (A2) comprising a polyol (a), an ethylenically unsaturated monomer (d), a radical polymerization initiator (k), a dispersant (e), and a base polymer polyol (h1) that is the intermediate (B1),
  wherein
  each concentration of the ethylenically unsaturated monomer (d) in the monomer-containing mixture liquids (A1) and (A2) before the initiation of polymerization in each step is 7 mass % to 25 mass %, a polymer content in the base polymer polyol (h1) is 7 mass % to 25 mass %, a conversion ratio of the ethylenically unsaturated monomer (d) to a polymer in each step is not less than 80 mass %, a conversion rate of the ethylenically unsaturated monomer (d) into a polymer since the polymerization is initiated until the conversion ratio becomes 80 mass % in each step is not less than 8 mass %/min, and a polymer content in a polymer polyol (Ia) obtained finally is 30 mass % to 45 mass %.

[4] A method for producing a polymer polyol (Ia), the method comprising:

a first step of polymerizing a monomer-containing mixture liquid (A1) comprising a polyol (a), an ethylenically unsaturated monomer (d), a radical polymerization initiator (k), and a dispersant (e), thereby obtaining a polymer polyol intermediate (B1); and an (i+1)th step of polymerizing a monomer-containing mixture liquid (Ai+1) comprising a polyol (a), an ethylenically unsaturated monomer (d), a radical polymerization initiator (k), a dispersant (e), and a base polymer polyol (hi) that is an intermediate (Bi), thereby obtaining a polymer polyol intermediate (Bi+1), where i is an integer incremented from 1 to n−1 whereby this step is repeated n−1 times, wherein the polymer polyol intermediate (Bi+1) is to be used as a base polymer polyol (hi+1) in a next step, whereby the ethylenically unsaturated monomer (d) is polymerized likewise, wherein the total number n of repetition times is 3 to 7, each concentration of the ethylenically unsaturated monomer (d) in the monomer-containing mixture liquids (A1) and (Ai+1) before the initiation of polymerization in each step is 7 mass % to 25 mass %, a polymer content in the base polymer polyol (hi) is 7 mass % to 50 mass %, and a polymer content in a polymer polyol (Ia) obtained finally is 30 mass % to 65 mass %.

[5] A method for producing a polyurethane resin, comprising the step of causing a polyol component and a polyisocyanate component to react, in the presence of one or more additives selected from a catalyst, a blowing agent, and a foam stabilizer as required, wherein the polymer polyol (Ia) obtained by the above-mentioned method of the invention [3] or [4] is used as at least a part of the polyol component.

Effects of the Invention

According to the polyol composition of the present invention, a polyurethane resin formed by using the polyol composition has an excellent mechanical strength.

With use of the method for producing a polyurethane resin according to the present invention, a mechanical strength, particularly elongation at break, is not impaired even if a resin fine particle-dispersed polyol composition is used for increasing a compressive hardness of a resin. Therefore, a high-quality polyurethane resin can be obtained.

Further, a resin fine particle-dispersed polyol composition having a low viscosity can be obtained.

Still further, with use of the method for producing a polymer polyol of the present invention, a polymer polyol having a sufficiently small particle diameter and a narrower particle size distribution can be obtained even if the content of acrylonitrile in a monomer is small. Therefore, a polyurethane resin formed by using such a polymer polyol has excellent mechanical strengths such as elongation at break. Additionally, a polymer polyol having a low viscosity can be produced.

DESCRIPTION OF THE INVENTION

A resin fine particle-dispersed polyol composition (I) according to the present invention may be either one of the following two compositions: one is a polyol (a) in which are dispersed resin fine particles (d) such as fine particles of a polymer (e.g. polystyrene, or ABS resin) obtained by (co) polymerization of an ethylenically unsaturated monomer (d) by a usual method such as suspension polymerization or emulsification polymerization; and the other is a composition obtained by (co)polymerization of a monomer (d) in the polyol (a), as well as a diluent (c) as required, in the presence of a radical polymerization initiator (k), and in the presence or absence of a dispersant (e). However, the latter is preferable because it exhibits superior dispersion stability. Here, "(co) polymerization" means homopolymerization or copolymerization, and this expression is used hereinafter. It should be noted that a resin fine particle-dispersed polyol composition obtained in the latter manner is referred to as "polymer polyol" hereinafter in some cases. The resin fine particle-dispersed polyol composition of the invention [1] described above is referred to as "polyol composition (I)" simply in some cases, and the resin fine particle-dispersed polyol composition obtained by the production methods according to the invention [3] or [4] described above is referred to as "polymer polyol (Ia)" simply in some cases. In other words, they all are resin fine particle-dispersed polyol compositions (in other words, polymer polyols), but particularly the resin fine particle-dispersed polyol composition obtained by the production methods of the invention [3] or [4] described above is referred to as "polymer polyol (Ia)".

In the polyol composition of the present invention, it is essential that an arithmetic standard deviation by volume of a particle size distribution of the resin fine particles (b), which is derived from respective values in 85 divisions of a range of 0.020 μm to 2000 μm determined by a laser diffraction/scattering particle size distribution analyzer (LA-750, manufactured by HORIBA Ltd.; this applies hereinafter), is not more than 0.6, preferably not more than 0.56, and more preferably not more than 0.4. If the arithmetic standard deviation exceeds 0.6, the polyurethane resin obtained does not have a sufficient mechanical strength (all values of the particle size distributions described hereinafter are values by volume).

It should be noted that the resin fine particles (b) have particle diameters substantially in the foregoing range. Herein "substantially" implies that not less than 98 percent by mass (mass %), preferably 100 mass %, of the particles have particle diameters in this range.

Further, the particle size distribution and the particle diameter of polymer particles in the polymer polyol (Ia) also preferably satisfy the same particle size distribution condition as that described above. It should be noted that the resin fine particles (b) and polymer particles in the polymer polyol (Ia) hereinafter are referred to collectively as "resin fine particles (b)" simply, unless otherwise specified particularly.

In the particle size distribution derived from values in 85 divisions of the range of 0.020 μm to 2000 μm determined by the laser diffraction/scattering particle size distribution analyzer, the resin fine particles (b) preferably satisfy a formula (1) shown below, more preferably a formula (1') shown below, and particularly preferably a formula (1") shown below:

$$[P]/[Q] \geq 1.7 \times [R]^{0.93} \quad (1)$$

$$[P]/[Q] \geq 1.71 \times [R]^{-0.75} \quad (1')$$

$$[P]/[Q] \geq 2.0 \times [R]^{-0.65} \quad (1'')$$

where [R] represents an arithmetic average particle diameter (µm), [P] represents a mode value (by volume: %), and [Q] represents a difference (µm) between the largest particle diameter and the smallest particle diameter. When the resin fine particles (b) satisfy the formula (1), the polyurethane resin exhibits excellent elongation (elongation at break).

Further, the foregoing arithmetic average particle diameter [R] of the resin fine particles (b) preferably is in a range of 0.3 µm to 3.0 µm. The lower limit of the foregoing range further preferably is 0.4 µm. The upper limit of the same further preferably is 2.0 µm, and particularly preferably 1.0 µm. When [R] is in the range of 0.3 µm to 3.0 µm, the polyol composition (I) and the polymer polyol (Ia) have low viscosities, thereby providing easy handling, while the polyurethane resin obtained exhibits excellent compressive hardness and mechanical strength.

In the particle size distribution derived from values in 85 divisions of the range of 0.020 to 2000 µm determined by the laser diffraction/scattering particle size distribution analyzer, the content of particles having diameters of not less than 10 µm in the resin fine particles (b) preferably is not more than 2 percent by volume (vol %), more preferably not more than 1 vol %, and particularly preferably 0 vol %. When the content of the particles having diameters of not less than 10 µm is not more than 2 vol %, the mechanical strength of the polyurethane resin, particularly the elongation at break and the tear strength thereof, is improved.

The content of the resin fine particles (b) in the polyol composition (I) of the present invention preferably is 35 to 65 mass %, more preferably 40 to 60 mass %, and particularly preferably 45 to 55 mass %. If the content of the resin fine particles (b) is in a range of 35 to 65 mass %, a polyurethane resin obtained, for example, a polyurethane foam, exhibits a sufficiently high compressive hardness (25% ILD), while the viscosity of the polyol composition (I) does not increase significantly, which makes it easy to handle the composition.

Further, a monomer-containing mixture liquid (A) used in the method for producing the polymer polyol (Ia) of the present invention is composed of a polyol (a), an ethylenically unsaturated monomer (d), a radical polymerization initiator (k), a dispersant (e), and a base polymer polyol (h). (It should be noted that the base polymer polyol (h) is not used in a monomer-containing mixture liquid (A1) in the first step.)

In the present invention (hereinafter the "present invention" simply mentioned refers to a common matter shared by the invention of the polyol composition (I) and the invention of the method for producing the polymer polyol (Ia), unless otherwise specified particularly), a known polyol usually used for producing a polymer polyol may be used as the polyol (a). Examples of the polyol (a) include compounds (a1) having a structure obtained by adding alkylene oxide to a compound having at least 2 (preferably 2 to 8) active hydrogen atoms (polyhydric alcohols, polyhydric phenols, amines, polycarboxylic acids, phosphoric acids, etc.), and mixtures of these. Among these, preferred are compounds having a structure obtained by adding alkylene oxide to a polyhydric alcohol.

Examples of polyhydric alcohols include dihydric alcohols having 2 to 20 carbon atoms (aliphatic diols, for instance, alkylene glycols such as ethylene glycol, propylene glycol, 1,3- or 1,4-butanediol, 1,6-hexanediol, and neopentylglycol; and alicyclic diols, for instance, cycloalkylene glycols such as cyclohexanediol and cyclohexanedimethanol); trihydric alcohols having 3 to 20 carbon atoms (aliphatic triols, for instance, alkane triols such as glycerol, trimethylolpropane, trimethylolethane, and hexanetriol); polyhydric alcohols having 4 to 8 or more hydroxyl groups and 5 to 20 carbon atoms (aliphatic polyols, for instance, alkane polyols such as pentaerythritol, sorbitol, mannitol, sorbitan, diglycerol, and dipentaerythritol, and intramolecular or intermolecular dehydration products of the alkane triols; and saccharides such as sucrose, glucose, mannose, fructose, and methylglucoside, and derivatives of the saccharides).

Examples of the polyhydric phenols include monocyclic polyhydric phenols such as pyrogallol, hydroquinone and phloroglucinol; bisphenols such as bisphenol A, bisphenol F and bisphenol sulfone; and condensation products of phenols and formaldehyde (novolak).

Examples of the amines include ammonia; and aliphatic amines such as alkanol amines having 2 to 20 carbon atoms (e.g. monoethanolamine, diethanolamine, isopropanolamine and aminoethylethanolamine), alkyl amines having 1 to 20 carbon atoms (e.g. n-butylamine and octylamine), alkylene diamines having 2 to 6 carbon atoms (e.g. ethylenediamine, propylenediamine and hexamethylenediamine), and polyalkylene polyamines (those ranging from dialkylene triamines to hexaalkylene heptamines that have 2 to 6 carbon atoms in the alkylene group, e.g. diethylenetriamine and triethylenetetramine).

Examples of the amines further include aromatic mono- or polyamines having 6 to 20 carbon atoms (e.g. aniline, phenylenediamine, tolylenediamine, xylylenediamine, diethyl toluenediamine, methylenedianiline, and diphenyl ether diamine); alicyclic amines having 4 to 20 carbon atoms (isophoronediamine, cyclohexylenediamine and dicyclohexylmethanediamine); and heterocyclic amines having 4 to 20 carbon atoms (e.g. aminoethylpiperazine).

Examples of the polycarboxylic acids include aliphatic polycarboxylic acids having 4 to 18 carbon atoms (e.g. succinic acid, adipic acid, sebacic acid, glutaric acid, and azelaic acid), aromatic polycarboxylic acids having 8 to 18 carbon atoms (e.g. terephthalic acid and isophthalic acid), and mixtures of two or more of these.

As the alkylene oxide added to the active hydrogen-containing compound, alkylene oxides having 2 to 8 carbon atoms are preferred. Examples of such alkylene oxides include ethylene oxide (hereinafter abbreviated as EO), propylene oxide (hereinafter abbreviated as PO), 1,2-, 1,3-, 1,4-, or 2,3-butylene oxide, styrene oxide, and the like, and combinations of two or more of these (block addition and/or random addition). Preferably, PO or a combination of PO and EO (containing not more than 25 mass % of EO) is used.

Specific examples of the polyol are an adduct obtained by adding PO to the above-described active hydrogen-containing compound, and an adduct obtained by adding PO and other alkylene oxide (hereinafter abbreviated as AO), preferably EO, to the active hydrogen-containing compound in a manner as described below, or an esterification product of such an adduct compound with a polycarboxylic acid or a phosphoric acid:

(i) block addition of PO-AO in this order (capped);
(ii) block addition of PO-AO-PO-AO in this order (balanced);
(iii) block addition of AO-PO-AO in this order;
(iv) block addition of PO-AO-PO in this order (active secondary);

(v) random addition of mixed PO and AO; or (vi) random addition or block addition according to the order described in the specification of U.S. Pat. No. 4,226,756.

Furthermore, a hydroxyl equivalent of the compound (a1) is preferably 200 to 4,000, more preferably 400 to 3,000. Two or more types of compounds (a1) in combination having a total hydroxy equivalent in the foregoing range preferably are used as well.

As the polyol (a), a combination of the compound (a1) formed by adding an alkylene oxide to the active hydrogen-containing compound and another polyol (a2) may be used. In this case, the ratio (by mass) of (a1)/(a2) used is preferably from 100/0 to 80/20.

Examples of the another polyol (a2) include macromolecular polyols such as polyester polyols and diene-type polyols, and mixtures of these.

Examples of the polyester polyols include:

condensation reaction products of the above described polyhydric alcohols and/or polyether polyols [e.g. dihydric alcohols such as ethylene glycol, diethylene glycol, propylene glycol, 1,3- or 1,4-butanediol, 1,6-hexanediol, and neopentylglycol; mixtures of these dihydric alcohols with polyhydric alcohols having three or more hydroxyl groups, such as glycerol and trimethylol propane; and low-mole (1 to 10 moles) alkylene oxide adducts of these polyhydric alcohols] with the above described polycarboxylic acids or ester-forming derivatives thereof such as anhydrides thereof or lower alkyl (the number of carbon atoms in the alkyl group: 1 to 4) esters thereof (e.g. adipic acid, sebacic acid, maleic anhydride, phthalic anhydride, dimethyl terephthalate, etc.);

condensation reaction products of the above-described polyhydric alcohols and/or polyether polyols with carboxylic anhydride and alkylene oxide;

alkylene oxide (EO, PO, etc.) adducts of the above-described condensation reaction products;

polylactone polyols, for instance, a product obtained by ring-opening polymerization of a lactone (s-caprolactone, etc.) by using the above-described polyhydric alcohol as an initiator; and polycarbonate polyols, for instance, a reaction product of the above-described polyhydric alcohol and alkylene carbonate.

Examples of the other polyols further include diene-type polyols such as polybutadiene polyol, and hydrogenate products of the same; hydroxyl-group-containing vinyl polymers such as acrylic polyols; polyols based on a natural oil, such as castor oil; and modification products of natural oil-based polyols.

Such a polyol (a2) usually has 2 to 8 hydroxyl groups, preferably 3 to 8 hydroxyl groups, and preferably have a hydroxyl equivalent of usually 200 to 4,000, and more preferably 400 to 3,000.

The number-average molecular weight (according to gel permeation chromatography (GPC); this also applies to the number-average molecular weights described below unless otherwise specified particularly) of the polyol (a) is usually at least 500, preferably from 500 to 20,000, particularly preferably from 1,200 to 15,000, and most preferably from 2,000 to 9,000. It is preferable that the number-average molecular weight of the polyol (a) is at least 500, from the viewpoint of the foaming property of the produced polyurethane foam. Furthermore, when the number-average molecular weight of (a) is not more than 20,000, the viscosity of the polyol (a) is low, which is desirable from the aspect of the handling properties of the polymer polyol. Furthermore, the polyol (a) preferably has a hydroxyl equivalent of 200 to 4000, more preferably 400 to 3000.

Examples of the ethylenically unsaturated monomer (d) used in the production of a polymer polyol include unsaturated nitriles (d1), aromatic-ring-containing monomers (d2), (meth)acrylic acid esters (d3), α-alkenyl group-containing alkylene oxide adducts (d4), other ethylenically unsaturated monomers (d5), and mixtures of two or more of these.

Examples of (d1) include acrylonitrile, and methacrylonitrile.

Examples of (d2) include styrene, α-methyl styrene, hydroxystyrene, and chlorostyrene.

Examples of (d3) include those composed of atoms of C, H, and O exclusively, for example: alkyl (meth)acrylate (the number of carbon atoms in the alkyl group: 1 to 24) such as methyl(meth)acrylate, butyl(meth)acrylate, nonyl(meth)acrylate, decyl(meth)acrylate, undecyl(meth)acrylate, dodecyl(meth)acrylate, tridecyl(meth)acrylate, tetradecyl(meth)acrylate, pentadecyl(meth)acrylate, hexadecyl(meth)acrylate, octadecyl(meth)acrylate, eicosyl(meth)acrylate and docosyl(meth)acrylate; and hydroxypolyoxyalkylene mono (meth)acrylates (the number of carbon atoms in the alkylene group: 2 to 8). In the present specification, the expression of "(meth)acrylate" means "acrylate and/or methacrylate", and this expression is used also hereinafter. This applies to the expressions of "(meth)acrylic acid" and "(meth)allyl".

Examples of (d4) include alkylene oxide adducts of terminal-unsaturated alcohol having 3 to 24 carbon atoms. Examples of the terminal-unsaturated alcohol include allyl alcohol, 2-butene-1-ol, 3-butene-2-ol, 3-butene-1-ol, and 1-hexene-3-ol. Preferred is an alkylene oxide adduct of allyl alcohol. The number of oxyalkylene units in (d4) is usually 1 to 9, preferably 1 to 6, and more preferably 1 to 3. Examples of the alkylene oxide include those mentioned as alkylene oxides to be added to the active hydrogen-containing compounds in the section of the polyol (a). Preferably, the alkylene oxide is PO and/or EO.

The number-average molecular weight of (d4) is usually 110 to 490. The lower limit of the foregoing range preferably is 112, more preferably 116, particularly preferably 170, and most preferably 180. The upper limit of the foregoing range preferably is 480, more preferably 450, particularly preferably 420, and most preferably 300. When the number-average molecular weigh is not less than 110, the polymer polyol has a lower viscosity, which is preferable from the viewpoint of handlability, and also a polyurethane resin obtained using the polymer polyol has excellent hardness. When the number-average molecular weight of (d4) is not more than 490, a polyurethane resin obtained using the foregoing polymer polyol is excellent in hardness.

The number of α-alkenyl groups in (d4) is at least one in average. It preferably is one to ten, more preferably one to two, and particularly preferably one. If the number of the α-alkenyl groups is less than one in average, the polyol contains increased soluble components. This results in not only an increased viscosity of a polymer polyol obtained, but also significantly deteriorated properties of a polyurethane resin obtained using the same.

Further, (d4) usually has a solubility parameter SP value of 9.5 to 13. The lower limit of the foregoing range preferably is 9.8, and more preferably 10.0. The upper limit of the foregoing range preferably is 12.5, and more preferably 12.2. When the SP value of (d4) is not less than 9.5, a polymer polyol produced by using the same has a lower viscosity. When the SP value is not more than 13, a polyurethane resin obtained by using the polymer polyol has an improved compressive hardness.

The SP value is expressed by the square root of the ratio of a cohesive energy density to a molar volume as follows:

[SP value]=$(\Delta E/V)^{1/2}$.

In the above equation, $\Delta E$ indicates a cohesive energy density, and V indicates a molecular volume. The value of V is determined by the calculation of Robert F. Fedors et al., which is described, for example, in *Polymer Engineering and Science*, Volume 14, pages 147 to 154.

Examples of the ethylenically unsaturated monomer (d5) other than those described above include (meth)acrylamide; vinyl-group-containing carboxylic acids such as (meth) acrylic acid, and derivatives of the same; aliphatic hydrocarbon monomers such as ethylene and propylene; fluorine-containing vinyl monomers, such as perfluorooctylethyl methacrylate and perfluorooctylethyl acrylate; nitrogen-containing vinyl monomers other than those described above, such as diaminoethyl methacrylate and morpholinoethyl methacrylate; vinyl-modified silicone; and cyclic olefin compounds, such as norbornene, cyclopentadiene, and norbornadiene.

Apart from such a monofunctional monomer, a small amount of a multifunctional monomer (d6) having two or more functional groups (except for those corresponding to (d4) having two or more functional groups) may be used in (d), whereby the dispersion stability of the resin fine particle-dispersed polyol can be improved further. Examples of the multifunctional monomer include divinyl benzene, ethylene di(meth)acrylate, polyalkylene oxide glycol di(meth)acrylate, pentaerythritol triallyl ether, trimethylolpropane tri(meth)acrylate, ester of an unsaturated carboxylic acid having a number-average molecular weight of not less than 500 and a glycol, and ester of an unsaturated alcohol and a carboxylic acid as described in WO 01/009242.

In the present invention, the ratio by mass of (d1), (d2), (d3), (d4), (d5), or (d6) in (d) is not limited particularly, and an excellent polymer polyol (Ia) can be obtained by the production method of the present invention, irrespective of the composition of monomer. The ratio however may be adjusted appropriately according to required properties of a polyurethane to be obtained, and the like.

The content of polyoxy alkylene ether (d4) of an α-alkenyl group-containing compound is, regarding its lower limit, preferably not less than 2 mass %, and more preferably not less than 3 mass %, with a view toward decreasing the viscosity of a polymer polyol. Concerning the upper limit of the content, the content preferably is not more than 15 mass %, and more preferably not more than 10 mass %, from the viewpoint of the properties (tensile strength, etc.) of a urethane resin to be obtained.

In regard to the resistance to scorching, the content of unsaturated nitrile (d1) (particularly acrylonitrile) preferably is not more than 70 mass %, and more preferably 15 to 60 mass %.

With a view toward decreasing the particle diameter of polymer particles in the polymer polyol, the content of the aromatic-ring-containing monomer (d2) (particularly styrene) preferably is not more than 98 mass %, more preferably 20 mass % to 90 mass %, and particularly preferably 35 mass % to 80 mass %.

The contents of monomers other than those described above in (d) are as follows: the content of (d3) preferably is 0 to 50 mass %, and more preferably 0 to 20 mass % the content of (d5) preferably is 0 to 10 mass %, and more preferably 0 to 5 mass %; and the content of (d6) preferably is 0.01 to 0.7 mass %, and more preferably 0.05 to 0.4 mass %.

The type of the dispersant (e) used during the foregoing polymerization process is not particularly limited, and a conventional dispersant used in polymer polyols can be employed.

Examples of the dispersant (e) include:

[1] macromer-type dispersants obtained by causing a polyol to react with an ethylenically unsaturated compound, such as an ethylenically unsaturated group-containing modified polyether polyol (e.g. JP 08(1996)-333508 A);

[2] graft-type dispersants obtained by combining a polyol with an oligomer, such as a graft polymer having two or more segments with an affinity for polyols as side chains, in which the difference between the solubility parameter of the side chains and the solubility parameter of a polyol is not more than 1.0, and having a segment with an affinity for polymers as a main chain, in which the difference between the solubility parameter of the main chain and the solubility parameter of a polymer formed from a vinyl monomer is not more than 2.0 (e.g. JP 05(1993)-059134 A);

[3] high-molecular-weight polyol type dispersants, e.g. a modified polyol obtained by causing at least a portion of the hydroxyl groups in a polyol to react with a methylene dihalide and/or an ethylene dihalide to increase its molecular weight (e.g. JP 07(1995)-196749 A); and

[4] oligomer type dispersants, e.g. a vinyl oligomer with a weight-average molecular weight of 1,000 to 30,000 at least a portion of which is soluble in polyols, and a dispersant comprising this oligomer and the ethylenically unsaturated group-containing modified polyether polyol described for [1] above in combination (e.g. see JP 09(1997)-77968 A).

Among these, the types [1] and [4] are preferred. In any case, it is preferable that the number-average molecular weight is 1,000 to 10,000.

In the case where the conventional dispersant (e) (including (e') that will be described later) is used, the amount of the same used is preferably 1 to 50%, and more preferably 2 to 40%, with respect to the mass of the ethylenically unsaturated monomer (d).

Apart from the above-described conventional dispersant, a reactive dispersant (e') described below, which is disclosed in U.S. Pat. No. 6,756,414 (corresponding JP 2002-308920 A), can be used as the dispersant (e). This reactive dispersant (e') is preferable for the same reasons as the preferable dispersants described above.

The reactive dispersant (e') is an unsaturated polyol having a nitrogen-containing bond, the polyol being formed by bonding a substantially saturated polyol (p) with a monofunctional active hydrogen compound (q) having at least one polymerizable unsaturated group via a polyisocyanate (f), wherein an average value of a ratio of a number of unsaturated groups to a number of nitrogen-containing bonds originating from an NCO group in one molecule of the polyol is 0.1 to 0.4.

Here, "substantially saturated" means that an unsaturation degree measured by the method specified in JIS K-1557 (1970 version) is not more than 0.2 meq/g (preferably not more than 0.08 meq/g).

As the polyol (p) composing the reactive dispersant (e'), any one of those described above as the polyol (a) can be used. The polyol (p) and the polyol (a) may be identical or different.

The number of hydroxyl groups in one molecule of the polyol (p) is at least two, preferably two to eight, and more preferably three to four. The hydroxyl equivalent of the polyol (p) is preferably 1000 to 3000, more preferably 1500 to 2500.

The compound (q) used for obtaining the reactive dispersant (e') is a compound having one active hydrogen-containing group and at least one polymerizable unsaturated group.

Examples of the active hydrogen-containing group include a hydroxyl group, an amino group, an imino group, a carboxyl group, an SH group, etc., among which a hydroxyl group is preferred.

The polymerizable unsaturated group of the compound (q) preferably has a polymerizable double bond, and the number of the polymerizable unsaturated groups in one molecule is one to three, and particularly one. More specifically, preferred as the compound (q) is an unsaturated monohydroxy compound having one polymerizable double bond.

Examples of the foregoing unsaturated monohydroxy compound include, for instance, monohydroxy-substituted unsaturated hydrocarbons, monoesters of unsaturated monocarboxylic acids and dihydric alcohols, monoesters of unsaturated dihydric alcohols and monocarboxylic acids, phenols having alkenyl side chain groups, and unsaturated polyether monools.

Examples of the monohydroxy-substituted unsaturated hydrocarbon include alkenol having 3 to 6 carbon atoms such as (meth)allyl alcohol, 2-butene-1-ol, 3-butene-2-ol, 3-butene-1-ol, and 1-hexene-3-ol; and alkynol, for instance, propargyl alcohol.

Usable as the monoester of an unsaturated monocarboxylic acid and a dihydric alcohol is, for example, a monoester of an unsaturated monocarboxylic acid having 3 to 8 carbon atoms and the above-described dihydric alcohol, the unsaturated monocarboxylic acid being acrylic acid, methacrylic acid, chrotonic acid, or itaconic acid, and the dihydric alcohol being a dihydric alcohol having 2 to 12 carbon atoms such as ethylene glycol, propylene glycol, or butylene glycol. Specific examples of the foregoing monoester include 2-hydroxy ethyl acrylate, 2-hydroxy ethyl methacrylate, 2-hydroxy propyl acrylate, 2-hydroxy propyl methacrylate, 2-hydroxy butyl acrylate, and 4-hydroxy butyl acrylate.

Usable as the monoester of an unsaturated dihydric alcohol and a monocarboxylic acid is, for example, a monoester of an unsaturated dihydric alcohol having 3 to 8 carbon atoms and a monocarboxylic acid having 2 to 12 carbon atoms, for instance, acetic acid monoester of butene diol.

Usable as the phenol having an alkenyl side chain group is, for example, a phenol having an alkenyl side chain group having 2 to 8 carbon atoms in an alkenyl group, such as oxystyrene, hydroxy-α-methyl styrene, etc.

Usable as the unsaturated polyether monool is, for example, a 1 to 50-mole alkylene oxide (having 2 to 8 carbon atoms) adduct of the monohydroxy-substituted unsaturated hydrocarbon or the phenol having the alkenyl side chain group [e.g. polyoxyethylene (polymerization degree: 2 to 10) monoallyl ether].

The examples of the compound (q) other than the unsaturated monohydroxy compounds include the following.

Examples of the compound (q) having an amino group or an imino group include mono- and di-(meth)allyl amine, amino alkyl (having 2 to 4 carbon atoms) (meth)acrylate [e.g. amino ethyl(meth)acrylate], and monoalkyl (having 1 to 12 carbon atoms) amino alkyl (having 2 to 4 carbon atoms) (meth)acrylate [e.g. monomethyl amino ethyl-methacrylate].

Examples of the compound (q) having a carboxyl group include the aforementioned unsaturated monocarboxylic acids.

Examples of the compound (q) having an SH group include compounds corresponding to the aforementioned unsaturated monohydroxy compounds (in which SH substitutes for OH).

Examples of the compound (q) having not less than two polymerizable unsaturated groups include poly(meth)allylethers of the aforementioned polyhydric alcohols having a valence of 3, 4 to 8, or more, or polyesters of the above alcohols with the aforementioned unsaturated carboxylic acids [e.g. trimethylol propane diallylether, pentaerythritol triallylether, glycerol di(meth)acrylate, etc.]

Among these compounds, preferred are the alkenols having 3 to 6 carbon atoms, the monoesters of unsaturated monocarboxylic acids having 3 to 8 carbon atoms and dihydric alcohols having 2 to 12 carbon atoms, and the phenols having alkenyl side chain groups. More preferred are monoesters of (meth)acrylic acids with ethylene glycol, propylene glycol, or butylene glycol; allyl alcohol; and hydroxy α-methyl styrene. Particularly preferred is 2-hydroxy ethyl(meth)acrylate.

Furthermore, though the molecular weight of the compound (q) is not particularly limited, it preferably is not more than 1000, and particularly preferably not more than 500.

The polyisocyanate (f) is a compound having at least two isocyanate groups, and examples of the same include aromatic polyisocyanates (f1), aliphatic polyisocyanates (f2), alicyclic polyisocyanates (f3), araliphatic polyisocyanates (f4), modification products of these polyisocyanates (modification products having a urethane group, a carbodiimide group, an allophanate group, a urea group, a biuret group, an isocyanurate group, or an oxazolidon group, etc.) (f5), and mixtures of two or more of these.

Examples of the aromatic polyisocyanate (f1) include aromatic diisocyanates having 6 to 16 carbon atoms (excluding those contained in NCO groups; this applies to the polyisocyanates mentioned below), aromatic triisocyanates having 6 to 20 carbon atoms, crude products of these isocyanates, etc. More specifically, the examples include 1,3- and/or 1,4-phenylene diisocyanate, 2,4- and/or 2,6-tolylene diisocyanate (TDI), crude TDI, 2,4'- and/or 4,4'-diphenyl methane diisocyanate (MDI), crude MDI [phosgenated compound of crude diaminodiphenyl methane where the crude diaminodiphenyl methane is a condensation product of formaldehyde with aromatic amine (aniline) or a mixture of the same; a mixture of diaminodiphenyl methane and a small amount (e.g. 5 to 20 mass %) of a polyamine having three or more functional groups; and polyallyl polyisocyanate (PAPI), etc.], naphthylene-1,5-diisocyanate, triphenyl methane-4,4',4"-triisocyanate, etc.

Examples of the aliphatic polyisocyanate (f2) include aliphatic diisocyanates having 2 to 18 carbon atoms. More specifically, the examples include 1,6-hexamethylene diisocyanate, 2,2,4-trimethylhexamethylene diisocyanate, lysine diisocyanate, etc.

Examples of the alicyclic polyisocyanate (f3) include alicyclic diisocyanates having 4 to 16 carbon atoms. More specifically, the examples include isophorone diisocyanate, 4,4'-dicyclohexyl methane diisocyanate, 1,4-cyclohexane diisocyanate, norbornane diisocyanate, etc.

Examples of the araliphatic isocyanate (f4) include araliphatic diisocyanates having 8 to 15 carbon atoms. More specifically, the examples include xylylene diisocyanate, α,α,α',α'-tetramethyl xylylene diisocyanate, etc.

Examples of the modified polyisocyanate (f5) include urethane-modified MDI, carbodiimide-modified MDI, sucrose-modified TDI, castor oil-modified MDI, etc.

Among these, aromatic diisocyanates are preferred, and 2,4- and/or 2,6-TDI is more preferred.

The nitrogen-containing bond of the reactive dispersant (e') is generated by reaction of an isocyanate group with an active hydrogen-containing group. In the case where the active hydrogen-containing group is a hydroxy group, a urethane bond is generated principally. In the case where the group is an amino group, a urea bond is generated principally.

An amide bond is generated in the case of a carboxyl group, while a thiourethane group is generated in the case of a SH group. In addition to these groups, another bond, for instance, a biuret bond, an allophanate bond, etc., may be generated.

These nitrogen-containing bonds are generally classified into two kinds; those generated by reaction of a hydroxy group of the substantially saturated polyol (p) with an isocyanate group of the polyisocyanate (f); and those generated by reaction of an active hydrogen-containing group of the unsaturated monofunctional active hydrogen compound (q) with an isocyanate group of the polyisocyanate (f).

The dispersant (e') is obtained by reacting (p), (q), and (f) so that K, indicative of an average of a ratio of the number of unsaturated groups to the number of nitrogen-containing bonds originating from NCO groups in one molecule of (f), is 0.1 to 0.4. K is derived according to the following formula.

$$K=[\text{number of moles of }(q)\times\text{number of unsaturated groups of }(q)]/[\text{number of moles of }(f)\times\text{number of NCO groups of }(f)]$$

The value of K is more preferably 0.1 to 0.3, and particularly preferably 0.2 to 0.3. In the case where the value of K is in the foregoing range, the polymer polyol has particularly excellent dispersion stability.

As the radical polymerization initiator (k) used in the polymerization of the ethylenically unsaturated monomer (d), a compound that forms a free radical to initiate polymerization may be used. Examples of such a compound include azo compounds, such as 2,2'-azobisisobutyronitrile, 2,2'-azobis (2,4-dimethylvaleronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methyl propionate), 2,2'-azobis[2-(hydroxymethyl)propionitrile] and 1,1'-azobis(1-acetoxy-1-phenylethane); organic peroxides such as dibenzoyl peroxide, dicumyl peroxide, bis(4-t-butylcyclohexyl)peroxidicarbonate, benzoyl peroxide, lauroyl peroxide and persuccinic acid; and inorganic peroxides, such as persulfates and perborates. Two or more of these may be used in combination.

The amount of the radical polymerization initiator (k) used is preferably 0.05 to 20 mass %, further preferably 0.1 to 5 mass %, particularly preferably 0.2 to 1.5 mass %, based on the mass of (d) used. When the amount of the polymerization initiator used is in a range from 0.05 to 20 mass %, the polymerization degree of (d) in the polymer polyol is sufficiently high, and also the molecular weight is high. Thus, this configuration is excellent in that a polyurethane foam having a sufficient foam compressive hardness can be obtained.

A diluent (c) having a solubility parameter (SP value) in a range of 7 to 11 may be added as required during the radical polymerzation. Examples of the diluent (c) include aromatic hydrocarbon solvents such as toluene and xylene; saturated aliphatic hydrocarbon solvents having 5 to 15 carbon atoms such as hexane, heptane, and n-decane; and unsaturated aliphatic hydrocarbon solvents having 5 to 30 carbon atoms such as octene, nonene, and decene. Preferred are aromatic hydrocarbon solvents. The amount of the diluent (c) used is preferably not more than 50 mass %, more preferably 1 to 40 mass %, based on the amount of (d) used. The diluent (c), after being used, preferably is removed by vacuum stripping or the like after the polymerization reaction.

Further, the diluent (c) may be added as required to the polyol composition (I) of the present invention or the polymer polyol (Ia) obtained by the method of the present invention, so that the composition has a further reduced viscosity. Examples of the diluent (c) to be contained in (I) or (Ia) include the aforementioned unsaturated aliphatic hydrocarbon solvents; aromatic hydrocarbon solvents; and fire retardants having a low viscosity (not more than 100 mPa·s/25° C.), for instance, tris(chloroethyl)phosphate, tris(chloropropyl)phosphate, etc.

The content of the diluent (c) in the polyol composition (I) or (Ia) obtained preferably is not more than 2 mass %, and more preferably not more than 1 mass %.

Further, a chain transfer agent (g) may be used as required in the monomer-containing mixture liquid (A) during the radical polymerization. Examples of the chain transfer agent (g) include alkyl mercaptans, such as dodecyl mercaptan and mercaptoethanol. The amount of the chain transfer agent (g) used is preferably not more than 2 mass %, and more preferably not more than 0.1 mass %, based on the amount of (d) used.

The method for obtaining the polyol composition (I) of the present invention is not limited particularly as long as a polyol composition (I) in which resin fine particles (b) are dispersed so as to have a predetermined arithmetic standard deviation by volume of a particle size distribution can be obtained. However, in the case of the method in which polymer fine particles (b) obtained by (co)polymerization of ethylenically unsaturated monomer (d) are dispersed in the polyol (a), the polyol composition can be obtained by, for example, selecting resin fine particles (b) obtained by classification, which satisfy the above-described arithmetic standard deviation, and using the selected particles (b) in a state of being dispersed in the polyol (a).

In the case of the method in which the monomer (d) is (co)polymerized in a dispersion medium composed of the polyol (a), the (co)polymerization method may be radical polymerization, coordinated anionic polymerization, metathesis polymerization, Diels-Alder polymerization, or the like. Preferably, radical polymerization is employed. The radical polymerization can be carried out in the same way as the conventional polymerization in a polymer polyol. For example, the method of polymerizing an ethylenically unsaturated monomer (d) in a polyol (a) containing a dispersant (e) in the presence of a radical polymerization initiator (k) (the method described in U.S. Pat. No. 3,383,351, etc.) may be employed. Further, the polymerization can be carried out by a method generally performed for producing a polymer polyol, such as the batch method or the continuous method, but preferably it is carried out by the one-step polymerization method or the multi-stage continuous polymerization method; more preferably it is carried out by the one-step polymerization method. A diluent (c), a chain transfer agent, and the like can be used as needed.

The one-step polymerization method in the present invention is a method in which the polyol (a), the monomer (d), and the dispersant (e), as well as the diluent (c) as required, are heated to a polymerization temperature, and thereafter a radical polymerization initiator (k) is added so that polymerization occurs. As described above, (k) preferably is added after a mixture composed of (a), (d), and (e), as well as (c) added as required, is heated to a polymerization temperature. Alternatively, however, (k) may be added thereto before the heating. Further, (d) may be divided into portions so as to be added portion by portion while a cycle of the adding, the heating, and the polymerizing in the stated order is repeated until an intended polymer concentration is obtained. The number of portions (number of divisions) preferably is 2 to 7, more preferably 2 to 5, particularly preferably 3 to 4, and most preferably 3. If the number of divisions is 1 to 7, the concentration of (d) in the polymerization system is kept low, whereby the growth of polymerization particles formed therein is suppressed, which results in a sharp particle distribution by volume. At the same time, an amount of bulky polymer particles having diameters of not less than 100 μm generated in the polymerization process is reduced sufficiently, while the ratio of particles having diameters of not less than 10 μm can be made not more than 2 vol % easily.

Generally, in the one-step polymerization method, as the number of divisions increases, the arithmetic standard deviation by volume of a particle size distribution decreases, whereby the value of (left side)-(right side) of Formula (1) increases. Here, there also are some cases where no further improvement is achieved even if the number of divisions is increased to more than three or four. Therefore, in a reaction system, if a polyol composition containing resin fine particles (b) of the present invention having an arithmetic standard deviation of not more than 0.6 is not obtained, or a polyol composition satisfying the relational expression of Formula (1) is not obtained, an intended polyol composition can be obtained by increasing the number of divisions, in many cases.

This also applies to the number of stages in the case where a multi-stage continuous polymerization method is employed. The preferable range of the number of stages is the same as the preferable range of the number of divisions. As the number of stages increases, the arithmetic standard deviation by volume of a particle distribution decreases, whereby the value of (left side)-(right side) of Formula (1) increases. Therefore, increasing the number of stages is effective for obtaining the polyol composition of the present invention.

It should be noted that in any polymerization method, increasing the amount of the dispersant (e) is effective for obtaining the polyol composition of the present invention.

Among the above-described one-step polymerization methods, the most preferable method for producing a polymer polyol is the method for producing a polymer polyol described in the inventions [3] and [4] described above.

In the production method of the invention [3], the monomer-containing mixture liquid (A1) composed of the above-described polyol (a), the ethylenically unsaturated monomer (d), the radical-polymerization initiator (k), and the dispersant (e) is polymerized in the first step, whereby a polymer polyol intermediate (B1) is obtained. Subsequently, in the second step, with use of the obtained (B1) as the base polymer polyol (h1), the monomer-containing mixture liquid (A2) composed of (h1), the polyol (a), the ethylenically unsaturated monomer (d), the radical polymerization initiator (k), and the dispersant (e) is polymerized, whereby a polymer polyol intermediate (B2) is obtained. The polymer polyol intermediate (B2) is subjected to a monomer-removing and solvent-removing treatment as required, whereby a polymer polyol (Ia) is obtained.

In the invention [4], in the first step, which is the same as that of the invention [3], the polymer polyol intermediate (B1) is obtained, and subsequently, in the second step, with use of the obtained (B1) as a base polymer polyol (h1), the same polymerization process as that in the invention [3] is carried out. Likewise, a polymer polyol intermediate (Bi) obtained in the i'th step ("i" represents an integer of 1 to n−1; this definition of "i" applies hereinafter) is used as the base polymer polyol (hi) in the (i+1)th step, and the polymerization step is repeated 1 to 5 times additionally (the total number "n" of times that polymerization is repeated, including the polymerization in the first and second steps, is an integer in a range of 3 to 7). The obtained polymer polyol intermediate is subjected to the same treatments as described above as required. By so doing, the polymer polyol (Ia) is obtained.

The number "n" of times that polymerization is repeated in the manufacturing methods of the inventions [3] and [4] is, regarding the lower limit thereof, usually not less than 2, and preferably not less than 3, with a view to keeping a monomer concentration low, while the number "n" is, regarding the upper limit thereof, usually not more than 7, preferably not more than 5, more preferably not more than 4, and most preferably not more than 3, from the viewpoint of productivity. If the number of times that polymerization is repeated is within the above-described range, the ratio of particles having a diameter of not less than 10 μm can be made not more than 2 mass %, which is preferred with a view toward lowering the viscosity of the polymer polyol.

In the method for producing a polymer polyol according to the present invention, it is preferable that in each step of repeated polymerization, a monomer-containing mixture liquid (A) obtained by adding the polyol (a), the ethylenically unsaturated monomer (d), the radical polymerization initiator (k), and the dispersant (e) to the base polymer polyol (h) obtained in a step previous to the current step is prepared and polymerized, with a view toward obtaining a polymer polyol having a smaller particle diameter and having a narrower particle size distribution. However, since (h) contains (a) and a part of (e), (a) and (e) are not necessarily added to (h). Such a case also is encompassed within the scope of the present invention.

The compositions of (a), (d), (k), and (e) used in each step of repeated polymerization may be the same as those in another step or may be different, but the compositions thereof in one step preferably are the same, or substantially the same, as those in another step.

The method for producing a polymer polyol according to the present invention may be the method in which (k) is mixed in the mixture liquid (A) preliminarily and the mixture liquid (A) is heated to a polymerization initiation temperature, or the method in which after (A) is heated to a polymerization initiation temperature, (k) is added to (A) so that polymerization is initiated. The latter method is economical since only a smaller amount of a radical polymerization initiator is used, and therefore it is preferable.

In the methods for producing a polymer polyol (Ia) according to the inventions [3] and [4], the concentration of the ethylenically unsaturated monomer (d) in the monomer-containing mixture liquid (A) prior to the initiation of polymerization in each step of repeated polymerization is, regarding the lower limit thereof, usually not less than 7 mass %, preferably not less than 10 mass %, and more preferably not less than 11 mass %, from the viewpoint of productivity. The foregoing concentration is, regarding the upper limit thereof, usually not more than 25 mass %, preferably not more than 24 mass %, and more preferably not more than 22 mass %, with a view to decreasing the average particle diameter of polymer particles in the polymer polyol (Ia). When the concentration of (d) exceeds 25 mass %, the diameter of polymer particles in the polymer polyol obtained increases. If the concentration of (d) is less than 7 mass %, the content of the oligomer components soluble in the polyol increases, which results in an increase in the viscosity.

In the production method according to the invention [4], the concentration of the polymer of the ethylenically unsaturated monomer (d) in the base polymer polyol (h) in each step of repeated polymerization subsequent to the second step is, regarding the lower limit thereof, usually not less than 7 mass %, preferably not less than 10 mass %, and further preferably not less than 11 mass % from the viewpoint of productivity. The foregoing concentration is, regarding the upper limit thereof, usually not more than 50 mass %, preferably not more than 48 mass %, and further preferably not more than 45 mass %, with a view to decreasing the average particle diameter of resin particles in the polymer polyol (Ia).

When the concentration of the polymer of (d) exceeds 50 mass %, the particle diameter of a polymer in a polymer polyol obtained increases. When the concentration of the same is less than 7 mass %, the content of oligomer components soluble in the polyol increases, which results in an increase in the viscosity.

In the invention [3], the concentration of the polymer of (d) in the base polymer polyol (h1) used in the second step is usually 7 to 25 mass %, preferably 10 to 25 mass %, and more preferably 13 to 25 mass %, for the same reasons as those described above.

In the method for producing a polymer polyol according to the present invention, the polymerization may be carried out in a continuous-flow-type pipe, or in a batch-type polymerization vessel. The former has a larger heat transfer area with respect to contents, thereby having more capability of removing polymerization heat, which is preferred from the viewpoint of productivity.

In the present invention, the polymerization temperature preferably is in a range of 50° C. to 200° C., more preferably 70° C. to 180° C., particularly preferably 90° C. to 160° C., most preferably 100° C. to 150° C. If the polymerization temperature is 50° C. or above, the viscosity of a polymer polyol obtained decreases. If the polymerization temperature is 200° C. or below, the polymerization ratio of the ethylenically unsaturated monomer (d) increases. Therefore, if such a polymer polyol thus obtained is used as a material for forming a polyurethane foam, the polyurethane foam obtained is allowed to exhibit a sufficient foam compressive hardness.

In the method for producing the polymer polyol (Ia) of the present invention, the conversion ratio (mass %) of (d) to a polymer in each step of repeated polymerization is, regarding the lower limit thereof, preferably not less than 80%, more preferably not less than 85%, and particularly preferably not less than 90% from the viewpoint of productivity. The ratio is, regarding the upper limit thereof, preferably not more than 99.5%, and more preferably not more than 99%, with a view toward decreasing the particle diameter.

In each step of repeated polymerization, the conversion rate (mass %/min., this applies hereinafter) since polymerization is initiated until the conversion ratio becomes 80% is, regarding the lower limit, preferably not less than 8, more preferably not less than 9, and particularly preferably not less than 10 with a view toward decreasing the particle diameter, while the conversion rate is, regarding the upper limit thereof, preferably not more than 100, more preferably not more than 50, and particularly preferably not more than 30 from the viewpoint of productivity (the amount of the radical polymerization initiator (k) used, etc.).

It should be noted that the number "n" of times that polymerization is repeated is two (the invention [3]), in order to obtain a polymer polyol having a smaller particle diameter and having a narrower particle size distribution in two stages, it is necessary that the conversion ratio of (d) to a polymer is not less than 80 mass % and that the conversion rate of (d) since polymerization is initiated until the conversion ratio becomes 80 mass % is not less than 8. The respective preferable ranges of these are the same as those described above.

In the invention [4], the polymer content of the polymer polyol (Ia) obtained is, regarding the lower limit thereof, usually not less than 30 mass %, and preferably not less than 35 mass % from the viewpoint of, for example, the elongation at break and the compressive hardness of a polyurethane resin obtained therefrom, such as a polyurethane foam. The foregoing polymer content is, regarding the upper limit, usually not more than 65 mass %, and preferably not more than 60 mass %, from the viewpoint of the handling of the monomer-containing mixture liquid (A).

In the invention [3], from the same viewpoints, the polymer content of the polymer polyol (Ia) is usually 30 to 45 mass %, and preferably 35 to 44 mass %.

In the polymer polyol (Ia) obtained by the method for producing a polymer polyol according to the present invention, in a particle size distribution by volume of polymer particles of the ethylenically unsaturated monomer (d), which is derived from respective values in 85 divisions of a range of 0.020 to 2000 μm determined by a laser diffraction/scattering particle size distribution analyzer (LA-750, manufactured by HORIBA Ltd.; this applies hereinafter), the content of particles having a diameter of 10 μm or more in the polymer particles is preferably not more than 2 vol %, more preferably not more than 1 vol %, and particularly preferably 0 vol %, from the viewpoint of physical properties (tear strength, etc.) of a polyurethane resin obtained therefrom.

It should be noted that the polymer particles substantially have a particle diameter in a range of 0.020 μm to 2000 μm. Here, with the term of "substantially", it is meant that not less than 98 mass %, more preferably 100 mass %, of the polymer particles have respective particle diameters in the foregoing range.

In the present invention, in the particle size distribution of polymer particles in (Ia) obtained, which is derived from respective values in 85 divisions of a range of 0.020 to 2000 μm determined by a laser diffraction/scattering particle size distribution analyzer, an arithmetic standard deviation by volume of the polymer particles is preferably not more than 0.6, more preferably not more than 0.56, and particularly not more than 0.4. When the arithmetic standard deviation is not more than 0.6, a polyurethane resin obtained has improved mechanical strengths, more specifically, improved elongation at break and improved tear strength.

In the present invention, in an obtained resin fine particle-dispersed polyol composition (polymer polyol), the content of bulky polymer particles having a diameter of not less than 100 μm, generated in the polymerization process, is preferably in a range of 1 ppm to 20 ppm. The upper limit thereof is more preferably 15 ppm, and particularly preferably 10 ppm. In the case where the content of bulky polymer particles is not more than 20 ppm, when filtering is carried out with use of a metal mesh or a strainer, the tendency of closing openings is reduced. This results in remarkable improvement of productivity.

The resin fine particle-dispersed polyol composition (I) of the present invention or the polymer polyol (Ia) obtained by the production method of the present invention is used at least as a part of the polyol component used in the production of a polyurethane resin. More specifically, (I) or (Ia) is used as at least a part of the polyol component, so as to react with a polyisocyanate component by a usual method, in the presence of one or more additives usually used, such as a catalyst, a blowing agent, and a foam stabilizer as required, so that a polyurethane resin is obtained. The polyol component may contain the polyol (a) as needed, in addition to (I) or (Ia).

As a polyisocyanate component, a known organic polyisocyanate conventionally used in the production of a polyurethane resin can be used. Examples of such a polyisocyanate include those mentioned as the polyisocyanate (f) above.

Among these preferred are 2,4- and 2,6-TDI, mixtures of isomers thereof, and crude TDI; 4,4'- and 2,4'-MDI, mixtures of isomers thereof, and crude MDI; and modified polyisocyanates derived from these polyisocyates and containing a urethane group, a carbodiimide group, an allophanate group, a urea group, a biuret group, or an isocyanurate group.

The isocyanate index [equivalent ratio of (NCO groups/active hydrogen atom-containing groups)×100] upon production of a polyurethane resin is preferably 80 to 140, more preferably 85 to 120, particularly preferably 95 to 115. Furthermore, the isocyanate index also can be considerably higher than the above range (e.g. 300 to 1000) to incorporate a polyisocyanurate group in the polyurethane resin.

When producing a polyurethane resin, a catalyst usually used in a polyurethane-forming reaction so as to accelerate the reaction [e.g. amine-based catalyst (tertiary amines such as triethylenediamine and N-ethylmorpholine), tin-based catalysts (e.g. stannous octoate, dibutyl tin dilaurate, etc.), and other metal catalysts (e.g. lead octoate)] can be used. The amount of the catalyst is usually from 0.001 to 5 mass %, based on the mass of the reaction mixture.

In the present invention, a blowing agent (e.g. water, HFC, HCFC, methylene chloride, etc.) may be used in the production of a polyurethane resin, whereby a polyurethane foam can be obtained. The amount of a blowing agent used may be changed according to a desired density of the polyurethane foam.

In the production of a polyurethane foam of the present invention, a foam stabilizer may be used as required. Examples of the foam stabilizer include a silicone surfactant (e.g. polysiloxane-polyoxyalkylene copolymer).

In the production of a polyurethane resin and a polyurethane foam of the present invention, a flame retardant may be used as required. Examples of the flame retardant include melamines, phosphoric acid esters, halogenated phosphoric acid esters, phosphazene derivatives, etc.

Examples of other additives that can be used in the present invention include a reaction retarder, a coloring agent, an internal mold release agent, an age retardant, an antioxidant, a plasticizer, an antibacterial agent, a carbon black, and other known additives such as a filler.

Production of a polyurethane resin can be carried out by an ordinary method, for example, one shot method, semi-prepolymer method, prepolymer method, or another known method.

In the production of a polyurethane resin, a usually used production device can be employed. When no solvent is used, for example, a device such as a kneader or extruder can be employed. Various types of non-foamed or foamed polyurethane resins can be produced within a closed or open mold. In the production of a polyurethane resin, usually the materials are mixed and caused to react with use of a mechanical device at a low pressure or high pressure. Furthermore, in the production of a polyurethane resin, the air dissolved in the materials or a gas such as air intermixed at the time of mixing can be removed by a vacuum method before or after mixing the raw materials (particularly before mixing the raw materials).

The polyol composition (I) or the polymer polyol (Ia) of the present invention is useful for producing a polyurethane foam, particularly flexible molded foams and slabstock foams. Furthermore, (I) or (Ia) also can be used suitably for forming a polyurethane resin or a polyurethane foam by the RIM (reaction injection molding) method.

EXAMPLES

The present invention is described further in detail with reference to the following examples. However, the present invention is not limited to these examples in any way. In the following, the values of parts, percentage, and ratio indicate those of parts by mass, percentage by mass, and ratio by mass, respectively.

The compositions, symbols, etc. of the materials used in the examples and comparative examples are as follows:
(1) Polyol (a1):
    polyol (a1-1): polyol obtained by adding PO-EO-PO in this order to glycerol, having a hydroxyl value of 56, and an internal EO unit content of 9%;
    polyol (a1-2): polyol obtained by adding PO-EO in this order to pentaerythritol, having a hydroxyl value of 32, and an terminal EO unit content of 14%
(2) Dispersant (e):
    e-1: reactive dispersant obtained by coupling 0.14 mole of the polyol (a1-2) and 0.07 mole of 2-hydroxyethyl methacrylate with use of 0.16 mole of TDI, the reactive dispersant having a hydroxyl value of 20, a ratio of the number of unsaturated groups/the number of nitrogen-containing groups of 0.22 [see U.S. Pat. No. 6,756,414 (corresponding Japanese publication: JP 2002-308920A)]
(3) Radical Polymerization Initiator (k)
    k-1: 2,2'-azobis(2,4-dimethylvaleronitrile)
    k-2: 1,1'-azobis(cyclohexane-1-carbonitrile)
(4) Organic Polyisocyanate
    TDI-80: "CORONATE T-80" [produced by NIPPON POLYURETHANE INDUSTRY CO., LTD.]
(5) Catalyst
    Catalyst A: "Neostann U-28" (stannous octoate) [produced by NITTO KASEI CO., LTD.]
    Catalyst B: "DABCO" (triethylenediamine) [produced by NIPPON NYUKAZAI CO., LTD.]
(6) Foam Stabilizer
    "SRX-280A" (polyether siloxane polymer) [produced by Dow Corning Toray Silicone Co., Ltd.]

PRODUCTION EXAMPLE 1

Production of Polymer Polyol Precursor (m1)

Into a pressure-resistant reaction container of a water-cooling jacket type, 73 parts of polyol (a1-1), 4.7 parts of acrylonitrile, 11 parts of styrene, 1 part of 2.2-mole PO adduct of allyl alcohol (number-average molecular weight: 186), 0.05 part of divinyl benzene, 1.6 parts of the dispersant (e-1), and 4.8 parts of xylene were charged, and the temperature of the mixture was adjusted to 107° C. under agitation. 0.09 part of the radical polymerization initiator (k-1) and 0.07 part of the radical polymerization initiator (k-2) were dissolved in 3.2 parts of xylene, and this solution was injected into the foregoing reaction container. After the initiators were added thereto, the polymerization was initiated quickly within 1 minute, and the temperature thereof reached the highest level of 160° C. about 6 minutes after. Aging was carried out for 30 minutes at 140° C. with the polymerization heat being removed, and a polymer polyol precursor (m1) was obtained. The conversion ratio and the conversion rate were 78% and 13 mass %/min, respectively.

PRODUCTION EXAMPLE 2

Production of Polymer Polyol Precursor (m2)

Into a pressure-resistant reaction container of a water-cooling jacket type, 100 parts of polymer polyol precursor (m1), 33 parts of polyol (a1-1), 14 parts of acrylonitrile, 33 parts of styrene, 3.3 parts of 2.2-mole PO adduct of allyl alcohol, 0.14 part of divinyl benzene, 4.7 parts of the dispersant (e-1), and 4.8 parts of xylene were charged, and the temperature of the mixture was adjusted to 107° C. under agitation. 0.24 part of the radical polymerization initiator (k-1) and 0.28 part of the radical polymerization initiator (k-2) were dissolved in 3.2 parts of xylene, and this solution was injected into the foregoing reaction container. After the initiators were added thereto, the polymerization was initiated quickly within 1 minute, and the temperature thereof reached the highest level of 160° C. about 6 minutes after. Aging was carried out for 30 minutes at 140° C. with polymerization heat being removed, and a polymer polyol precursor (m2) was obtained. The conversion ratio and the conversion rate were 84% and 14 mass %/min, respectively.

EXAMPLE 1

Production of Polymer Polyol (F-1)

Into a pressure-resistant reaction container of a water-cooling jacket type capable of removing solvent by distillation, 100 parts of polymer polyol precursor (m2), 16 parts of polyol (a1-1), 19 parts of acrylonitrile, 44 parts of styrene, 4.4 parts of 2.2-mole PO adduct of allyl alcohol, 0.2 part of divinyl benzene, 6.3 parts of the dispersant (e-1), and 6 parts of xylene were charged, and the temperature of the mixture was adjusted to 107° C. under agitation. 0.32 part of the radical polymerization initiator (k-1) and 0.37 part of the radical polymerization initiator (k-2) were dissolved in 3.2 parts of xylene, and this solution was injected into the foregoing reaction container. After the initiators were added thereto, the polymerization was initiated quickly within 1 minute, and the temperature thereof reached the highest level of 160° C. about 6 minutes after. Aging was carried out for 30 minutes at 140° C. with polymerization heat being removed. Further, a non-reacted monomer and xylene were removed by vacuum stripping at 2666 to 3999 Pa (20 to 30 torr) for two hours. As a result, a polymer polyol (F-1) with a resin fine particle concentration of 50%, and a viscosity of 5700 mPa·s (25° C.) was obtained.

EXAMPLE 2

Production of Polymer Polyol (F-2)

Into a pressure-resistant reaction container of a water-cooling jacket type capable of removing solvent by distillation, 37 parts of polyol (a1-1), 14 parts of acrylonitrile, 33 parts of styrene, 3.3 parts of 2.2-mole PO adduct of allyl alcohol, 0.1 part of divinyl benzene, 4.7 parts of the dispersant (e-1), and 4.8 parts of xylene were charged, and the temperature of the mixture was adjusted to 100° C. under agitation. Here, 0.32 part of the radical polymerization initiator (k-1) and 0.37 part of the radical polymerization initiator (k-2) were dissolved in 3.2 parts of xylene, and this solution was injected into the foregoing reaction container. Aging was carried out for 30 minutes at 140° C. with polymerization heat being removed. Further, a non-reacted monomer and xylene were removed by vacuum stripping at 2666 to 3999 Pa (20 to 30 torr) for two hours. As a result, a polymer polyol (F-2) with a resin fine particle concentration of 50%, and a viscosity of 5500 mPa·s (25° C.) was obtained.

EXAMPLE 3

Production of Polymer Polyol (F-3)

Two continuous polymerization vessels were prepared and arranged in series. Each of the first and second vessels was filled with 1000 parts of the polyol (a1-1), and the temperature was raised to 130° C. Subsequently, a mixture liquid (G1) was transferred continuously to the polymerization vessels at a rate of 1600 parts/hour; the mixture liquid (G1) had been obtained by line blending, with use of a static mixer, 53 parts of the polyol (a1-1), 10 parts of acrylonitrile, 24 parts of styrene, 2.4 parts of 2.2-mole PO adduct of allyl alcohol, 0.1 part of divinyl benzene, 3.4 parts of the dispersant (e-1), 6 parts of xylene, 0.2 part of the radical polymerization initiator (k-1), and 0.2 part of the radical polymerization initiator (k-2). On the other hand, a reaction liquid containing a polymer polyol that overflowed from the first vessel was merged with a mixture liquid (G2) flowing at a rate of 817 parts/hour, immediately before entering the second polymerization vessel; the mixture liquid (G2) was obtained by line blending, with use of a static mixer, 7.3 parts of the polyol (a1-1), 20 parts of acrylonitrile, 48 parts of styrene, 4.8 parts of 2.2-mole PO adduct of allyl alcohol, 0.2 part of divinyl benzene, 6.8 parts of the dispersant (e-1), 12 parts of xylene, 0.4 part of the radical polymerization initiator (k-1), and 0.4 part of the radical polymerization initiator (k-2). The merged mixture liquid was fed to the polymerization vessel continuously so that polymerization occurred. Further, a non-reacted monomer was removed by vacuum stripping at 2666 to 3999 Pa (20 to 30 torr) for two hours. As a result, a polymer polyol (F-3) with a resin fine particle concentration of 50%, and a viscosity of 5800 mPa·s (25° C.) was obtained.

COMPARATIVE EXAMPLE 1

Production of Comparative Polymer Polyol (R-1)

Into a four-neck flask provided with a thermoregulator, a vacuum rotor, a dropping pump, and a Dimroth condenser, 30 parts of the polyol (a1-1), 1 part of the dispersant (e-1), and 7 parts of xylene were charged, and the temperature was raised to 130° C. while the components were stirred in a nitrogen atmosphere. Subsequently, a liquid obtained by uniformly mixing 13 parts of polyol (a1-1), 15 parts of acrylonitrile, 34 parts of styrene, 3.6 parts of 2.2-mole PO adduct of allyl alcohol, 0.15 part of divinyl benzene, 2.7 parts of the dispersant (e-1), and 0.5 part of the polymerization initiator (k-1) was dropped continuously over three hours by using the dropping pump, so as to be polymerized at 130° C. Further, a non-reacted monomer and xylene were removed by vacuum stripping at 2666 to 3999 Pa (20 to 30 torr) for two hours. As a result, a polymer polyol (R-1) with a resin fine particle concentration of 50%, and a viscosity of 7800 mPa·s (25° C.) was obtained.

COMPARATIVE EXAMPLE 2

Production of Comparative Polymer Polyol (R-2)

A comparative polymer polyol (R-2) with a resin fine particle concentration of 50% and a viscosity of 4700 mPa·s (25° C.) was obtained in the same manner as that of Example 1 above, except that the amount of the dispersant (e-1) used was 1.8 parts.

COMPARATIVE EXAMPLE 3

Production of Comparative Polymer Polyol (R-3)

A continuous polymerization device was prepared, and a polymerization vessel thereof preliminarily was filled with 2000 parts of the polyol (a1-1), and the temperature was raised to 130° C. Subsequently, a raw material mixture liquid (G3) was fed continuously to the polymerization vessels at a rate of 2417 parts/hour so that polymerization occurred; the liquid (G3) had been obtained by line blending, with use of a static mixer, 34 parts of the polyol (a1-1), 10 parts of acrylonitrile, 42 parts of styrene, 0.03 part of divinyl benzene, 7 parts of the dispersant (e-1), 8 parts of xylene, and 0.5 part of the radical polymerization initiator (k-1). Further, a non-reacted monomer was removed by vacuum stripping at 2666 to 3999 Pa (20 to 30 torr) for two hours. As a result, a comparative polymer polyol (R-3) with a resin fine particle concentration of 50%, and a viscosity of 6900 mPa·s (25° C.) was obtained.

Properties of the polymer polyols (F-1) to (F-3) and comparative polymer polyols (R-1) to (R-3) thus obtained are shown in Table 1.

<Largest Particle Diameter, Smallest Particle Diameter>

The largest particle diameter and the smallest particle diameter are indicative of largest and smallest diameter values, respectively, among particle diameters of particles with frequencies (vol %) of not less than 0.1 vol % in each of the 85 divisions of the particle diameter range (unit: μm).

<Mode Value [P]>

The mode value [P] is indicative of a ratio (by volume) of particles having a particle diameter corresponding to the highest abundance ratio in each of the 85 divisions of the particle diameter range with respect to the all particles. (unit: %)

TABLE 1

| Polymer polyol | Example | | | Comparative Example | | |
|---|---|---|---|---|---|---|
| | 1<br>F-1 | 2<br>F-2 | 3<br>F-3 | 1<br>R-1 | 2<br>R-2 | 3<br>R-3 |
| Resin fine particle concentration (mass %) | 50 | 50 | 50 | 50 | 50 | 50 |
| Viscosity (mPa · s/25° C.) | 5700 | 5500 | 5800 | 7800 | 4800 | 6900 |
| Arithmetic average particle diameter [R] (μm) | 0.58 | 1.25 | 1.45 | 0.699 | 1.43 | 2.19 |
| Arithmetic standard deviation of particle size distribution | 0.34 | 0.526 | 0.355 | 0.712 | 0.789 | 5.19 |
| Mode value [P] [vol %] | 11.2 | 16.5 | 17.3 | 10.8 | 10.8 | 13.2 |
| Largest particle diameter (μm) | 2.3 | 7.7 | 2.6 | 5.9 | 10.7 | 34.3 |
| Smallest particle diameter (μm) | 0.1 | 0.1 | 0.6 | 0.1 | 0.1 | 0.8 |
| [Q] | 2.2 | 7.6 | 2.0 | 5.8 | 10.5 | 33.5 |
| [P]/[Q] | 5.1 | 2.2 | 8.6 | 1.9 | 1.0 | 0.4 |
| $1.7 \times [R]^{-0.93}$ | 2.8 | 1.4 | 1.2 | 2.4 | 1.2 | 0.8 |
| Content of particles with a diameter of 10 μm or more (vol %) | 0 | 0 | 0 | 3.2 | 3.7 | 5.5 |
| <Conversion ratio and rate> | | | | | | |
| Conversion ratio (mass %) | 95 | 87 | 91 | 91 | 91 | 90 |
| Conversion rate (mass %/min) | 15 | 18 | 4 | 4 | 4 | 6 |

The following is a description of the methods of evaluation of polymer polyols as to the items shown in Tables.

The determination of a particle diameter, an arithmetic standard deviation, a mode value, etc. shown below was performed by diluting an obtained polymer polyol with a polyol used therein so that a transmittance of laser light was 70 to 90%, and were determined by the particle size distribution analyzer shown below.

Device: LA-750, manufactured by HORIBA Ltd.
Measurement theory: Mie diffusion theory
Measurement range: 0.020 μm to 2000 μma
Light source: He—Ne laser (632.8 nm) 1 mW tungsten lamp 50 W
Measurement time: 20 seconds
relative refractive index: 1.2 (relative solvent: polyol)

<Arithmetic Average Particle Diameter [R] and Arithmetic Standard Deviation>

The arithmetic average particle diameter [R] and the arithmetic standard deviation were calculated by the following formulae.

Arithmetic average particle diameter (μm)=$\Sigma[q(J) \times X(J)] / \Sigma[q(J)]$ J: particle diameter range division number (1 to 85)
q(J): mode distribution value (%)
X(J): particle diameter (μm) of particles in a particle diameter range division No. J Arithmetic standard deviation=$[\Sigma[(X(J)-\text{arithmetic average particle diameter } (\mu m))^2 \times q(J)/100]]^{1/2}$ <Polymer Content>

A polymer polyol was diluted with methanol so that polymer polyol/methanol=1/3 (ratio) was satisfied. A polymer was separated by a refrigerated centrifuge (18000 rpm×60 min. 20° C.) and a supernatant fluid was removed. This process was repeated three times, and the polymer was dried under reduced pressure (60° C.×1 hr). The mass of the same was measured, and a ratio of the same to the polymer polyol was determined.

<Viscosity>

The viscosity was measured by using a BL-type viscometer (Tokyo Keiki Kogyo Co., Ltd.) under conditions of No. 3 rotor, 12 rpm, and 25° C.

<Conversion Ratio>

The conversion ratio was determined by a mass average of calculated remaining monomer contents of monomers with respect to a charged monomer amount. The remaining monomer content was calculated based on an area ratio of a remaining monomer with respect to an internal standard substance by gas chromatography. A specific analyzing method with respect to styrene is shown below as an example.

Conversion ratio [mass %]=100−100×[(remaining styrene content) [%]/(charged amount of styrene in raw materials) [%]]

Remaining styrene content [%]=$L/M$×(factor with respect to internal standard substance)

$L$=(peak area of remaining styrene)/(mass [g] of polymer polyol)

$M$=(peak area of internal standard substance)/(mass [g] of internal standard substance)

The factor with respect to an internal standard substance is obtained by dividing the peak area of each monomer of the same mass with the peak area of the internal standard substance.

Gas chromatograph: GC-14B (manufactured by Shimadzu Corporation)

Column: inner diameter: 4 mmφ, length: 1.6 mm, made of glass

Column filler: polyethylene glycol 20 M (manufactured by Shinwa Chemical Industries, Ltd.)

Internal standard substance: bromobenzene (manufactured by Nacalai Tesque, Inc.)

Diluting solvent: dipropylene glycol monomethyl ether, extra pure reagent [manufactured by Wako Pure Chemical Industries, Ltd.] (used in a state of 50% solution)

Injeciton temperature: 200° C.
Column initial temperature: 110° C.
Temperature rising rate: 5° C./min
Column final temperature: 200° C.
Sample injection amount: 1 μl <Conversion Rate>

The conversion rate (mass %/min) is a value obtained by dividing a conversion ratio at a certain time from polymerization initiation by the time from polymerization initiation. The measurement of the conversion ratio at a certain time from polymerization initiation was conducted by the following method: a polymer polyol was sampled at predetermined time intervals since polymerization initiation, and a polymerization inhibitor (e.g. hydroquinone) immediately was added to each sample so that polymerization was deactivated; then, this polymer polyol was analyzed by the above-described method of determining the conversion ratio. The time from the initiation of polymerization until the conversion ratio became 80% is determined by, for example, plotting, on a plotting paper, a time from the initiation of polymerization until the conversion ratio became 75% and a time from the initiation of polymerization until the conversion ratio became 85%, with respect to a time and a polymerization ratio, and extending a straight line between the two points so that a time when the conversion ratio became 80% is indicated.

EXAMPLES 4 TO 6 AND COMPARATIVE EXAMPLES 4 TO 6>

Production of Polyurethane Foam

With use of the polymer polyols (F-1 to F-3) obtained in Examples 1 to 3 and the comparative polymer polyols (R-1 to R-3) obtained in Comparative Examples 1 to 3, polyurethane foams were produced by the foaming process below, at the mixing ratios of polyurethane foams shown in Table 2. The properties of these foams are shown in Table 2. The process for producing the foams was as follows:

(1) The temperatures of a polymer polyol, a mixture of a polyol (a1-1), and organic polyisocyanate were adjusted to 25±2° C.

(2) A polymer polyol, the polyol (a1-1), a foam stabilizer, water, and a catalyst were charged in this order into a stainless steel-made beaker of 1-liter volume, and stirred and mixed at room temperature (25±2° C.). Immediately, an organic polyisocyanate was added. Using an agitator (Homodisper; manufactured by TOKUSHU KIKA INDUSTRIES, Ltd.; stirring condition, 2000 rpm×8 seconds), the mixture was stirred, and foaming was carried out.

(3) After stopping stirring, the content was put into a wooden box (25° C.±2° C.) of 25×25×10 cm, and a polyurethane foam was obtained.

TABLE 2

| | Example | | | Comparative Example | | |
|---|---|---|---|---|---|---|
| | 4 | 5 | 6 | 4 | 5 | 6 |
| Polymer Polyol | F-1 | F-2 | F-3 | R-1 | R-2 | R-3 |
| Polyurethane Foam <mixing ratio (parts)> | | | | | | |
| Polymer polyol | 55 | 55 | 55 | 55 | 55 | 55 |
| Polyol (a1-1) | 45 | 45 | 45 | 45 | 45 | 45 |
| Water | 2.8 | 2.8 | 2.8 | 2.8 | 2.8 | 2.8 |
| Catalyst A | 0.06 | 0.06 | 0.06 | 0.06 | 0.06 | 0.06 |
| Catalyst B | 0.18 | 0.18 | 0.18 | 0.18 | 0.18 | 0.18 |
| SRX-280A | 0.53 | 0.53 | 0.53 | 0.53 | 0.53 | 0.53 |
| TDI-80 | 34.3 | 34.2 | 34.3 | 34.3 | 34.2 | 34.1 |
| <Foam Properties> | | | | | | |
| Density [kg/m$^3$] | 34.7 | 34.6 | 34.5 | 34.5 | 34.5 | 34.8 |
| 25% ILD [kgf/314 cm$^2$] | 24.7 | 24.6 | 24.1 | 24.2 | 23.6 | 23.3 |
| Tensile strength [kgf/cm$^2$] | 1.54 | 1.48 | 1.53 | 1.43 | 1.38 | 1.16 |
| Tear strength [kgf/cm] | 0.87 | 0.86 | 0.82 | 0.62 | 0.62 | 0.63 |
| Elongation at break [%] | 118 | 114 | 116 | 102 | 96 | 90 |
| Compression set [%] | 2.1 | 2.0 | 2.2 | 2.4 | 2.5 | 2.4 |

The foam properties in the tables relating to polyurethane foams were evaluated by the methods as follows.

Density (kg/m$^3$): according to JIS K6400-1997 [item 5]
25% ILD (hardness) (kgf/314 cm$^2$): according to JIS K6382-1995 [item 5.3]
Tensile Strength (kgf/cm$^2$): according to JIS K6301-1995 [item 3]
Tear Strength (kgf/cm): according to JIS K6301-1995 [item 9]
Elongation at break (%): according to JIS K6301-1995 [item 3]
Compression Set (%): according to JIS K6382-1995 [item 5.5]

It should be noted that usually, as the properties of polyurethane foams, a density in the range of 15 to 50 kg/m$^3$ is preferable, and larger values of 25% ILD, tensile strength, tear strength, and elongation at break are preferable. Furthermore, a smaller value of compression set is preferable.

Based on the results shown in Tables 1 and 2, Examples 1 to 3, in which an arithmetic standard deviation of a particle size distribution, derived from respective values in 85 divisions of a range of 0.020 to 2000 μm determined by a laser diffraction/scattering particle size distribution analyzer, is not more than 0.6, are compared with Comparative Examples 1 to 3 having an arithmetic standard deviation of more than 0.6. Polyurethane foams (Examples 4 to 6) obtained by using the polymer polyols (F-1) to (F-3) obtained in Examples 1 to 3 were significantly excellent in 25% ILD, tensile strength, tear strength, and elongation at break, and exhibited a considerable improvement regarding compression set.

It should be noted that the above described Examples are described herein as examples according to the inventions [1] and [2]. On the other hand, Example 1 also serves as an example of the invention [4], and Example 4 also serves as example of the invention [5].

EXAMPLE 7

Production of Polymer Polyol (Ia-1): Concentration of (d): 25%, Repetition: Twice

[First Step] Into a 1.5-liter pressure-resistant reaction container of a water-cooling jacket type, 323.5 parts of polyol (a1-1), 31.7 parts of acrylonitrile, 74 parts of styrene, 7.4 parts of 2.2-mole PO adduct of allyl alcohol (number-average molecular weight: 186), 0.32 part of divinyl benzene, 10.6 parts of the dispersant (e-1), and 34 parts of xylene were charged, and the temperature of the mixture was adjusted to 90° C. under agitation. 1.06 parts of the radical polymerization initiator (k-1) and 0.32 part of the radical polymerization initiator (k-2) were dissolved in 5.5 parts of xylene, and this solution was mixed with the foregoing mixture, so that polymerization was initiated. The polymerization was initiated quickly within 1 minute after the radical polymerization initiator solution was added, and the temperature reached the highest level of 160° C. about 6 minutes after. After the highest temperature was reached, aging was carried out for 10 minutes, whereby a polymer-containing polyol intermediate (B1-1) was obtained.

[Second Repetitive Step] Subsequently, with use of (B1-1) as the base polymer polyol (h1-1), 40.5 parts of polyol (a1-1), 47.6 parts of acrylonitrile, 111 parts of styrene, 11.1 parts of 2.2-mole PO adduct of allyl alcohol, 0.48 part of divinyl benzene, 15.8 parts of the dispersant (e-1), and 11.5 parts of xylene were added to (h1-1), and the temperature of the mixture was adjusted to 90° C. under agitation. 0.95 part of (k-1) and 0.48 part of (k-2) were dissolved in 5.3 parts of xylene, and this solution was mixed with the foregoing mixture, so that polymerization was initiated. The polymerization was initiated quickly within 1 minute after the radical polymerization initiator solution was added, and the temperature reached the highest level of 160° C. about 6.5 minutes after. After the highest temperature was reached, aging was carried out for 10 minutes, whereby a polymer polyol intermediate (B2-1) was obtained. Non-reacted monomers and xylene were removed from (B2-1) by vacuum stripping at 2666 to 3999 Pa (20 to 30 torr) for two hours. As a result, a polymer polyol (Ia-1) with a polymer content of 40%, a volume-average particle diameter of 0.46 μm, and a viscosity of 2800 mPa·s (25° C.) was obtained.

EXAMPLE 8

Production of Polymer Polyol (Ia-2); Concentration of (d): 21.5%, Repetition: Three Times

[First Step] Into a 1.5-liter pressure-resistant reaction container of a water-cooling jacket type, 363 parts of polyol (a1-1), 31.7 parts of acrylonitrile, 74 parts of styrene, 7.4 parts of 2.2-mole PO adduct of allyl alcohol, 0.32 part of divinyl benzene, 10.6 parts of the dispersant (e-1), and 34 parts of xylene were charged, and the temperature of the mixture was adjusted to 90° C. under agitation. 1.06 parts of the radical polymerization initiator (k-1) and 0.32 part of the radical polymerization initiator (k-2) were dissolved in 5.5 parts of xylene, and this solution was mixed with the foregoing mixture, so that polymerization was initiated. The polymerization was initiated quickly within 1 minute after the radical polymerization initiator solution was added, and the temperature reached the highest level of 160° C. about 6 minutes after. After the highest temperature was reached, aging was carried out for 10 minutes, whereby a polymer polyol intermediate (B1-2) was obtained.

[Second Repetitive Step] Subsequently, with use of (B1-2) as the base polymer polyol (h1-2), 20 parts of polyol (a1-1), 44 parts of acrylonitrile, 104 parts of styrene, 10.4 parts of 2.2-mole PO adduct of allyl alcohol, 0.44 part of divinyl benzene, 14.8 parts of the dispersant (e-1), and 11.5 parts of xylene were added to (h1-2), and the temperature of the mixture was adjusted to 90° C. under agitation. 0.88 part of (k-1) and 0.44 part of (k-2) were dissolved in 5.3 parts of xylene, and this solution was mixed with the foregoing mixture, so that polymerization was initiated. After the radical polymerization initiator solution was added, the polymerization was initiated quickly within 1 minute, and the temperature reached the highest level of 160° C. about 6 minutes after. After reaching the highest temperature, aging was carried out for 10 minutes, whereby a polymer polyol intermediate (B2-2) was obtained.

[Third Repetitive Step] Further, with use of (B2-2) as the base polymer polyol (h2-2), 27.4 parts of polyol (a1-1), 62 parts of acrylonitrile, 145 parts of styrene, 14.5 parts of 2.2-mole PO adduct of allyl alcohol, 0.62 part of divinyl benzene, 20.7 parts of the dispersant (e-1), and 16.2 parts of xylene were added to (h2-2), and the temperature of the mixture was adjusted to 90° C. under agitation. 1.24 parts of (k-1) and 0.62 part of (k-2) were dissolved in 7.5 parts of xylene, and this solution was mixed with the foregoing mixture, so that polymerization was initiated. The polymerization was initiated quickly within 1 minute after the radical polymerization initiator solution was added, and the temperature reached the highest level of 160° C. about 6 minutes after. After the highest temperature was reached, aging was carried out for 10 minutes, whereby a polymer polyol intermediate (B3-2) was obtained. Non-reacted monomers and xylene were removed from (B3-2) by vacuum stripping at 2666 to 3999 Pa (20 to 30 torr) for two hours. As a result, a polymer polyol (Ia-2) with a polymer content of 50%, a volume-average particle diameter of 0.54 μm, and a viscosity of 5200 mPa·s (25° C.) was obtained.

EXAMPLE 9

Production of Polymer Polyol (Ia-3); Concentration of (d): 11.3%, Repetition: Three Times

[First Step] Into a 1.5-liter pressure-resistant reaction container of a water-cooling jacket type, 800 parts of polyol (a1-1), 31.7 parts of acrylonitrile, 74 parts of styrene, 7.4 parts of 2.2-mole PO adduct of allyl alcohol, 0.32 part of divinyl benzene, 10.6 parts of the dispersant (e-1), and 75 parts of xylene were charged, and the temperature of the mixture was adjusted to 90° C. under agitation. 1.06 parts of the radical polymerization initiator (k-1) and 0.32 part of the radical polymerization initiator (k-2) were dissolved in 5.5 parts of xylene, and this solution was mixed with the foregoing mixture, so that polymerization was initiated. The polymerization proceeded quickly after the radical polymerization initiator solution was added, and the temperature reached the highest level of 125° C. about 9 minutes after. Then, aging was carried out for 10 minutes at the same temperature, whereby a polymer polyol intermediate (B1-3) was obtained.

[Second Repetitive Step] Subsequently, with use of (B1-3) as the base polymer polyol (h1-3), 16 parts of polyol (a1-1), 37 parts of acrylonitrile, 87 parts of styrene, 8.7 parts of 2.2-mole PO adduct of allyl alcohol, 0.37 part of divinyl benzene, 12.4 parts of the dispersant (e-1), and 9.7 parts of xylene were added to (h1-3), and the temperature of the mixture was adjusted to 90° C. under agitation. 0.75 part of (k-1) and 0.37 part of (k-2) were dissolved in 5.2 parts of xylene, and this solution was mixed with the foregoing mixture, so that polymerization was initiated. The polymerization proceeded quickly after the radical polymerization initiator solution was added, and the temperature reached the highest level of 125° C. about 9 minutes after. Then, aging was carried out for 10 minutes at the same temperature, whereby a polymer polyol intermediate (B2-3) was obtained.

[Third Repetitive Step] Further, with use of (B2-3) as the base polymer polyol (h2-3), 19.4 parts of polyol (a1-1), 44 parts of acrylonitrile, 102 parts of styrene, 10.2 parts of 2.2-mole PO adduct of allyl alcohol, 0.44 part of divinyl benzene, 14.6 parts of the dispersant (e-1), and 11.4 parts of xylene were added to (h2-3), and the temperature of the mixture was adjusted to 90° C. under agitation. 0.88 parts of (k-1) and 0.44 part of (k-2) were dissolved in 5.3 parts of xylene, and this solution was mixed with the foregoing mixture, so that polymerization was initiated. The polymerization proceeded quickly after the radical polymerization initiator solution was added, and the temperature reached the highest level of 125° C. about 9 minutes after. Then, aging was carried out for 10 minutes at the same temperature, whereby a polymer polyol intermediate (B3-3) was obtained. Non-reacted monomers and xylene were removed from (B3-3) by vacuum stripping at 2666 to 3999 Pa (20 to 30 torr) for two hours. As a result, a polymer polyol (Ia-3) with a polymer content of 30%, a volume-average particle diameter of 0.38 μm, and a viscosity of 3800 mPa·s (25° C.) was obtained.

EXAMPLE 10

Production of Polymer Polyol (Ia-4); Concentration of (d): 16.1%, Repetition: Four Times

[First Step] Into a 1.5-liter pressure-resistant reaction container of a water-cooling jacket type, 522 parts of polyol (a1-1), 31.7 parts of acrylonitrile, 74 parts of styrene, 7.4 parts of 2.2-mole PO adduct of allyl alcohol, 0.32 part of divinyl benzene, 10.6 parts of the dispersant (e-1), and 51 parts of xylene were charged, and the temperature of the mixture was adjusted to 90° C. under agitation. 1.06 parts of the radical polymerization initiator (k-1) and 0.32 part of the radical polymerization initiator (k-2) were dissolved in 5.5 parts of xylene, and this solution was mixed with the foregoing mixture, so that polymerization was initiated. The polymerization proceeded quickly after the radical polymerization initiator solution was added, and the temperature thereof reached the highest level of 140° C. about 7 minutes after. Then, aging was carried out for 10 minutes at the same temperature, whereby a polymer polyol intermediate (B1-4) was obtained.

[Second Repetitive Step] Subsequently, with use of (B1-4) as the base polymer polyol (h1-4), 18 parts of polyol (a1-1), 40 parts of acrylonitrile, 94 parts of styrene, 9.4 parts of 2.2-mole PO adduct of allyl alcohol, 0.40 part of divinyl benzene, 13.4 parts of the dispersant (e-1), and 10.5 parts of xylene were added to (h1-4), and the temperature of the mixture was adjusted to 90° C. under agitation. 0.81 part of (k-1) and 0.40 part of (k-2) were dissolved in 4.8 parts of xylene, and this solution was mixed with the foregoing mixture, so that polymerization was initiated. The polymerization proceeded quickly after the radical polymerization initiator solution was added, and the temperature thereof reached the highest level of 140° C. about 7 minutes after. Then, aging was carried out for 10 minutes at the same temperature, whereby a polymer polyol intermediate (B2-4) was obtained.

[Third Repetitive Step] Further, with use of (B2-4) as the base polymer polyol (h2-4), 22.6 parts of polyol (a1-1), 51 parts of acrylonitrile, 119 parts of styrene, 12.0 parts of 2.2-mole PO adduct of allyl alcohol, 0.51 part of divinyl benzene, 17.1 parts of the dispersant (e-1), and 13.4 parts of xylene were added to (h2-4), and the temperature of the mixture was adjusted to 90° C. under agitation. 1.03 parts of (k-1) and 0.51 part of (k-2) were dissolved in 6.2 parts of xylene, and this solution was mixed with the foregoing mixture, so that polymerization was initiated. The polymerization proceeded quickly after the radical polymerization initiator solution was added, and the temperature reached the highest level of 140° C. about 7 minutes after. Then, aging was carried out for 10 minutes at the same temperature, whereby a polymer polyol intermediate (B3-4) was obtained.

[Fourth Repetitive Step] Further, with use of (B3-4) as the base polymer polyol (h3-4), 28.8 parts of polyol (a1-1), 65 parts of acrylonitrile, 152 parts of styrene, 15.3 parts of 2.2-mole PO adduct of allyl alcohol, 0.65 part of divinyl benzene, 21.8 parts of the dispersant (e-1), and 17.1 parts of xylene were added to (h3-4), and the temperature of the mixture was adjusted to 90° C. under agitation. 1.31 parts of (k-1) and 0.65 part of (k-2) were dissolved in 7.8 parts of xylene, and this solution was mixed with the foregoing mixture, so that polymerization was initiated. The polymerization proceeded quickly after the radical polymerization initiator solution was added, and the temperature reached the highest level of 140° C. about 7 minutes after. Then, aging was carried out for 10 minutes at the same temperature, whereby a polymer-containing polyol intermediate (B4-4) was obtained. Non-reacted monomers and xylene were removed from (B4-4) by vacuum stripping at 2666 to 3999 Pa (20 to 30 torr) for two hours. As a result, a polymer polyol (Ia-4) with a polymer content of 50%, a volume-average particle diameter of 0.56 μm, and a viscosity of 5200 mPa·s (25° C.) was obtained.

EXAMPLE 11

Production of Polymer Polyol (Ia-5); Concentration of (d): 11.8%, Repetition: Six Times

[First Step] Into a 3-liter pressure-resistant reaction container of a water-cooling jacket type, 755 parts of polyol (a1-1), 31.7 parts of acrylonitrile, 74 parts of styrene, 7.4 parts of 2.2-mole PO adduct of allyl alcohol, 0.32 part of divinyl benzene, 10.6 parts of the dispersant (e-1), and 75 parts of xylene were charged, and the temperature of the mixture was adjusted to 90° C. under agitation. 1.06 parts of the radical polymerization initiator (k-1) and 0.32 part of the radical polymerization initiator (k-2) were dissolved in 5.5 parts of xylene, and this solution was mixed with the foregoing mixture, so that polymerization was initiated. The polymerization proceeded quickly after the radical polymerization initiator solution was added, and the temperature reached the highest level of 125° C. about 8 minutes after. Then, aging was carried out for 10 minutes at the same temperature, whereby a polymer-containing polyol intermediate (B1-5) was obtained.

[Second Repetitive Step] Subsequently, with use of (B1-5) as the base polymer polyol (h1-5), 17 parts of polyol (a1-1), 37 parts of acrylonitrile, 88 parts of styrene, 8.8 parts of 2.2-mole PO adduct of allyl alcohol, 0.38 part of divinyl benzene, 12.5 parts of the dispersant (e-1), and 9.8 parts of xylene were added to (h1-5), and the temperature of the mixture was adjusted to 90° C. under agitation. 0.75 part of (k-1) and 0.38 part of (k-2) were dissolved in 4.5 parts of xylene, and this solution was mixed with the foregoing mixture, so that polymerization was initiated. The polymerization proceeded quickly after the radical polymerization initiator solution was added, and the temperature reached the highest level of 125° C. about 8 minutes after. Then, aging was carried out for 10 minutes at the same temperature, whereby a polymer polyol intermediate (B2-5) was obtained.

[Third Repetitive Step] Further, with use of (B2-5) as the base polymer polyol (h2-5), 19.7 parts of polyol (a1-1), 45 parts of acrylonitrile, 104 parts of styrene, 10.4 parts of 2.2-mole PO adduct of allyl alcohol, 0.45 part of divinyl benzene, 14.9 parts of the dispersant (e-1), and 11.6 parts of xylene were added to (h2-5), and the temperature of the mixture was adjusted to 90° C. under agitation. 1.03 parts of (k-1) and 0.51 part of (k-2) were dissolved in 6.2 parts of xylene, and this solution was mixed with the foregoing mixture, so that polymerization was initiated. The polymerization proceeded quickly after the radical polymerization initiator solution was added, and the temperature reached the highest level of 125° C. about 8 minutes after. Then, aging was carried out for 10 minutes at the same temperature, whereby a polymer polyol intermediate (B3-5) was obtained.

[Fourth Repetitive Step] Further, with use of (B3-5) as the base polymer polyol (h3-5), 23.4 parts of polyol (a1-1), 53 parts of acrylonitrile, 124 parts of styrene, 12.4 parts of 2.2-mole PO adduct of allyl alcohol, 0.53 part of divinyl benzene, 17.6 parts of the dispersant (e-1), and 13.8 parts of xylene were added to (h3-5), and the temperature of the mixture was adjusted to 90° C. under agitation. 1.06 parts of (k-1) and 0.53 part of (k-2) were dissolved in 6.4 parts of xylene, and this solution was mixed with the foregoing mixture, so that polymerization was initiated. The polymerization proceeded quickly after the radical polymerization initiator solution was added, and the temperature reached the highest level of 140° C. about 8 minutes after. Then, aging was carried out for 10 minutes at the same temperature, whereby a polymer polyol intermediate (B4-5) was obtained.

[Fifth Repetitive Step] Further, with use of (B4-5) as the base polymer polyol (h4-5), 27.7 parts of polyol (a1-1), 63 parts of acrylonitrile, 147 parts of styrene, 14.7 parts of 2.2-mole PO adduct of allyl alcohol, 0.63 part of divinyl benzene, 20.9 parts of the dispersant (e-1), and 16.4 parts of xylene were added to (h4-5), and the temperature of the mixture was adjusted to 90° C. under agitation. 1.26 parts of (k-1) and 0.63 part of (k-2) were dissolved in 7.5 parts of xylene, and this solution was mixed with the foregoing mixture, so that polymerization was initiated. The polymerization proceeded quickly after the radical polymerization initiator solution was added, and the temperature reached the highest level of 125° C. about 8 minutes after. Then, aging was carried out for 10 minutes at the same temperature, whereby a polymer polyol intermediate (B5-5) was obtained.

[Sixth Repetitive Step] Further, with use of (B5-5) as the base polymer polyol (h5-5), 32.9 parts of polyol (a1-1), 75 parts of acrylonitrile, 174 parts of styrene, 17.4 parts of 2.2-mole PO adduct of allyl alcohol, 0.75 part of divinyl benzene, 24.8 parts of the dispersant (e-1), and 19.5 parts of xylene were added to (h5-5), and the temperature of the mixture was adjusted to 90° C. under agitation. 1.49 parts of (k-1) and 0.75 part of (k-2) were dissolved in 8.9 parts of xylene, and this solution was mixed with the foregoing mixture, so that polymerization was initiated. The polymerization proceeded quickly after the radical polymerization initiator solution was added, and the temperature reached the highest level of 125° C. about 8 minutes after. Then, aging was carried out for 10 minutes at the same temperature, whereby a polymer polyol intermediate (B6-5) was obtained. Non-reacted monomers and xylene were removed from (B6-5) by vacuum stripping at 2666 to 3999 Pa (20 to 30 torr) for two hours. As a result, a polymer polyol (Ia-5) with a polymer content of 50%, a volume-average particle diameter of 0.52 µm, and a viscosity of 5000 mPa·s (25° C.) was obtained.

EXAMPLE 12

Production of Polymer Polyol (Ia-6); Concentration of (d): 21.5%, Repetition: Three Times

[First Step] Into a 1.5-liter pressure-resistant reaction container of a water-cooling jacket type, 370 parts of polyol (a1-1), 31.7 parts of acrylonitrile, 74 parts of styrene, 0.32 part of divinyl benzene, 10.6 parts of the dispersant (e-1), and 34 parts of xylene were charged, and the temperature of the mixture was adjusted to 90° C. under agitation. 1.06 parts of the radical polymerization initiator (k-1) and 0.32 part of the radical polymerization initiator (k-2) were dissolved in 5.5 parts of xylene, and this solution was mixed with the foregoing mixture, so that polymerization was initiated. The polymerization was initiated quickly within 1 minute after the radical polymerization initiator solution was added, and the temperature reached the highest level of 160° C. about 6 minutes after. After the highest temperature was reached, aging was carried out for 10 minutes, whereby a polymer polyol intermediate (B1-6) was obtained.

[Second Repetitive Step] Subsequently, with use of (B1-6) as the base polymer polyol (h1-6), 30 parts of polyol (a1-1), 44 parts of acrylonitrile, 104 parts of styrene, 0.44 part of divinyl benzene, 14.8 parts of the dispersant (e-1), and 11.5 parts of xylene were added to (h1-6), and the temperature of the mixture was adjusted to 90° C. under agitation. 0.88 part of (k-1) and 0.44 part of (k-2) were dissolved in 5.3 parts of xylene, and this solution was mixed with the foregoing mixture, so that polymerization was initiated. The polymerization was initiated quickly within 1 minute after the radical polymerization initiator solution was added, and the temperature reached the highest level of 160° C. about 6 minutes after. After the highest temperature was reached, aging was carried out for 10 minutes, whereby a polymer polyol intermediate (B2-6) was obtained.

[Third Repetitive Step] Further, with use of (B2-6) as the base polymer polyol (h2-6), 32 parts of polyol (a1-1), 62 parts of acrylonitrile, 145 parts of styrene, 0.62 part of divinyl benzene, 20.7 parts of the dispersant (e-1), and 16.2 parts of xylene were added to (h2-6), and the temperature of the mixture was adjusted to 90° C. under agitation. 1.24 parts of (k-1) and 0.62 part of (k-2) were dissolved in 7.5 parts of xylene, and this solution was mixed with the foregoing mixture, so that polymerization was initiated. The polymerization was initiated quickly within 1 minute after the radical polymerization initiator solution was added, and the temperature reached the highest level of 160° C. about 6 minutes after. After the highest temperature was reached, aging was carried out for 10 minutes, whereby a polymer polyol intermediate (B3-6) was obtained. Non-reacted monomers and xylene were removed from (B3-6) by vacuum stripping at 2666 to 3999 Pa (20 to 30 torr) for two hours. As a result, a polymer polyol (Ia-6) with a polymer content of 50%, a volume-average particle diameter of 0.54 µm, and a viscosity of 5400 mPa·s (25° C.) was obtained.

EXAMPLE 13

Production of Polymer Polyol (Ia-7); Concentration of (d): 23.8%, Repetition: Three Times

[First Step] Into a 1.5-liter pressure-resistant reaction container of a water-cooling jacket type, 340 parts of polyol (a1-1), 53 parts of acrylonitrile, 53 parts of styrene, 7.4 parts of 2.2-mole PO adduct of allyl alcohol, 0.32 part of divinyl benzene, and 10.6 parts of the dispersant (e-1) were charged, and the temperature of the mixture was adjusted to 90° C. under agitation. 1.06 parts of the radical polymerization initiator (k-1) and 0.32 part of the radical polymerization initiator (k-2) were dissolved in 5.5 parts of xylene, and this solution was mixed with the foregoing mixture, so that polymerization was initiated. The polymerization was initiated quickly within 1 minute after the radical polymerization initiator solution was added, and the temperature reached the highest level of 160° C. about 4 minutes after. After the highest temperature was reached, aging was carried out for 10 minutes, whereby a polymer polyol intermediate (B1-7) was obtained.

[Second Repetitive Step] Subsequently, with use of (B1-7) as the base polymer polyol (h1-7), 40 parts of polyol (a1-1), 78 parts of acrylonitrile, 78 parts of styrene, 10.9 parts of 2.2-mole PO adduct of allyl alcohol, 0.47 part of divinyl benzene, and 15.5 parts of the dispersant (e-1) were added to (h1-7), and the temperature of the mixture was adjusted to 90° C. under agitation. 0.93 part of (k-1) and 0.46 part of (k-2) were dissolved in 5.6 parts of xylene, and this solution was mixed with the foregoing mixture, so that polymerization was initiated. The polymerization was initiated quickly within 1 minute after the radical polymerization initiator solution was added, and the temperature reached the highest level of 160° C. about 4 minutes after. After the highest temperature was reached, aging was carried out for 10 minutes, whereby a polymer polyol intermediate (B2-7) was obtained.

[Third Repetitive Step] Further, with use of (B2-7) as the base polymer polyol (h2-7), 58.5 parts of polyol (a1-1), 115 parts of acrylonitrile, 115 parts of styrene, 16.1 parts of 2.2-mole PO adduct of allyl alcohol, 0.69 part of divinyl benzene, and 22.9 parts of the dispersant (e-1) were added to (h2-7), and the temperature of the mixture was adjusted to 90° C. under agitation. 1.38 parts of (k-1) and 0.69 part of (k-2) were dissolved in 8.2 parts of xylene, and this solution was mixed with the foregoing mixture, so that polymerization was initiated. The polymerization was initiated quickly within 1 minute after the radical polymerization initiator solution was added, and the temperature reached the highest level of 160° C. about 4 minutes after. After the highest temperature was reached, aging was carried out for 10 minutes, whereby a polymer polyol intermediate (B3-7) was obtained. Non-reacted monomers and xylene were removed from (B3-7) by vacuum stripping at 2666 to 3999 Pa (20 to 30 torr) for two hours. As a result, a polymer polyol (Ia-7) with a polymer content of 50%, a volume-average particle diameter of 0.54 μm, and a viscosity of 5200 mPa·s (25° C.) was obtained.

EXAMPLE 14

Production of Polymer Polyol (Ia-8); Concentration of (d): 21.5%, Repetition: Three Times

[First Step] Into a 1.5-liter pressure-resistant reaction container of a water-cooling jacket type, 363 parts of polyol (a1-1), 31.7 parts of acrylonitrile, 74 parts of styrene, 7.4 parts of 6-mole PO adduct of allyl alcohol (number-average molecular weight: 412), 0.32 part of divinyl benzene, 10.6 parts of the dispersant (e-1), and 34 parts of xylene were charged, and the temperature of the mixture was adjusted to 90° C. under agitation. 1.06 parts of the radical polymerization initiator (k-1) and 0.32 part of the radical polymerization initiator (k-2) were dissolved in 5.5 parts of xylene, and this solution was mixed with the foregoing mixture, so that polymerization was initiated. The polymerization was initiated quickly within 1 minute after the radical polymerization initiator solution was added, and the temperature reached the highest level of 160° C. about 6 minutes after. After the highest temperature was reached, aging was carried out for 10 minutes, whereby a polymer polyol intermediate (B1-8) was obtained.

[Second Repetitive Step] Subsequently, with use of (B1-8) as the base polymer polyol (h1-8), 20 parts of polyol (a1-1), 44 parts of acrylonitrile, 104 parts of styrene, 10.4 parts of 6-mole PO adduct of allyl alcohol, 0.44 part of divinyl benzene, 14.8 parts of the dispersant (e-1), and 11.5 parts of xylene were added to (h1-8), and the temperature of the mixture was adjusted to 90° C. under agitation. 0.88 part of (k-1) and 0.44 part of (k-2) were dissolved in 5.3 parts of xylene, and this solution was mixed with the foregoing mixture, so that polymerization was initiated. After the radical polymerization initiator solution was added, the polymerization was initiated quickly within 1 minute, and the temperature reached the highest level of 160° C. about 6 minutes after. After reaching the highest temperature, aging was carried out for 10 minutes, whereby a polymer polyol intermediate (B2-8) was obtained.

[Third Repetitive Step] Further, with use of (B2-8) as the base polymer polyol (h2-8), 27.4 parts of polyol (a1-1), 62 parts of acrylonitrile, 145 parts of styrene, 14.5 parts of 6-mole PO adduct of allyl alcohol, 0.62 part of divinyl benzene, 20.7 parts of the dispersant (e-1), and 16.2 parts of xylene were added to (h2-8), and the temperature of the mixture was adjusted to 90° C. under agitation. 1.24 parts of (k-1) and 0.62 part of (k-2) were dissolved in 7.5 parts of xylene, and this solution was mixed with the foregoing mixture, so that polymerization was initiated. The polymerization was initiated quickly within 1 minute after the radical polymerization initiator solution was added, and the temperature reached the highest level of 160° C. about 6 minutes after. After the highest temperature was reached, aging was carried out for 10 minutes, whereby a polymer polyol intermediate (B3-8) was obtained. Non-reacted monomers and xylene were removed from (B3-8) by vacuum stripping at 2666 to 3999 Pa (20 to 30 torr) for two hours. As a result, a polymer polyol (Ia-8) with a polymer content of 50%, a volume-average particle diameter of 0.54 μm, and a viscosity of 4900 mPa·s (25° C.) was obtained.

EXAMPLE 15

Production of Polymer Polyol (Ia-9); Concentration of (d): 21.5%, Repetition: Three Times

[First Step] Into a 1.5-liter pressure-resistant reaction container of a water-cooling jacket type, 363 parts of polyol (a1-1), 31.7 parts of acrylonitrile, 74 parts of styrene, 3.2 parts of 2.2-mole PO adduct of allyl alcohol, 0.32 part of divinyl benzene, 10.6 parts of the dispersant (e-1), and 34 parts of xylene were charged, and the temperature of the mixture was adjusted to 90° C. under agitation. 1.06 parts of the radical polymerization initiator (k-1) and 0.32 part of the radical polymerization initiator (k-2) were dissolved in 5.5 parts of xylene, and this solution was mixed with the foregoing mixture, so that polymerization was initiated. The polymerization was initiated quickly within 1 minute after the radical polymerization initiator solution was added, and the temperature reached the highest level of 160° C. about 6 minutes after. After the highest temperature was reached, aging was carried out for 10 minutes, whereby a polymer polyol intermediate (B1-9) was obtained.

[Second Repetitive Step] Subsequently, with use of (B1-9) as the base polymer polyol (h1-9), 20 parts of polyol (a1-1), 44 parts of acrylonitrile, 104 parts of styrene, 4.4 parts of 2.2-mole PO adduct of allyl alcohol, 0.44 part of divinyl benzene, 14.8 parts of the dispersant (e-1), and 11.5 parts of xylene were added to (h1-9), and the temperature of the mixture was adjusted to 90° C. under agitation. 0.88 part of (k-1) and 0.44 part of (k-2) were dissolved in 5.3 parts of xylene, and this solution was mixed with the foregoing mixture, so that polymerization was initiated. After the radical polymerization initiator solution was added, the polymerization was initiated quickly within 1 minute, and the temperature reached the highest level of 160° C. about 6 minutes after. After reaching the highest temperature, aging was carried out for 10 minutes, whereby a polymer polyol intermediate (B2-9) was obtained.

[Third Repetitive Step] Further, with use of (B2-9) as the base polymer polyol (h2-9), 27.4 parts of polyol (a1-1), 62 parts of acrylonitrile, 145 parts of styrene, 6.2 parts of 2.2-mole PO adduct of allyl alcohol, 0.62 part of divinyl benzene, 20.7 parts of the dispersant (e-1), and 16.2 parts of xylene were added to (h2-9), and the temperature of the mixture was adjusted to 90° C. under agitation. 1.24 parts of (k-1) and 0.62 part of (k-2) were dissolved in 7.5 parts of xylene, and this solution was mixed with the foregoing mixture, so that polymerization was initiated. The polymerization was initiated quickly within 1 minute after the radical polymerization initiator solution was added, and the temperature reached the highest level of 160° C. about 6 minutes after. After the highest temperature was reached, aging was carried out for 10 minutes, whereby a polymer polyol intermediate (B3-9) was obtained. Non-reacted monomers and xylene were removed from (B3-9) by vacuum stripping at 2666 to 3999 Pa (20 to 30 torr) for two hours. As a result, a polymer polyol (Ia-9) with a polymer content of 50%, a volume-average particle diameter of 0.54 µm, and a viscosity of 5200 mPa·s (25° C.) was obtained.

COMPARATIVE EXAMPLE 7

Production of Polymer Polyol (R-7); Concentration of (d): 50%, No Repetition

Into a 1.5-liter pressure-resistant reaction container of a water-cooling jacket type, 800 parts of polyol (a1-1), 150 parts of acrylonitrile, 350 parts of styrene, 35 parts of 2.2-mole PO adduct of allyl alcohol, 1.5 parts of divinyl benzene, 50 parts of the dispersant (e-1), and 160 parts of xylene were charged, and the temperature of the mixture was adjusted to 90° C. under agitation. 3.0 parts of the radical polymerization initiator (k-1) and 1.5 parts of the radical polymerization initiator (k-2) were dissolved in 18 parts of xylene, and this solution was mixed with the foregoing mixture, so that polymerization was initiated. The polymerization proceeded quickly after the radical polymerization initiator solution was added, and aging was carried out for 10 minutes at the highest temperature of 180° C. while cooling was carried out, whereby a polymer-containing polyol intermediate (C1-1) was obtained. Non-reacted monomers and xylene were removed from (C1-1) by vacuum stripping at 2666 to 3999 Pa (20 to 30 torr) for two hours. As a result, a comparative polymer polyol (R-7) with a polymer content of 50%, a volume-average particle diameter of 1.6 µm, and a viscosity of 10800 mPa·s (25° C.) was obtained.

COMPARATIVE EXAMPLE 8

Production of Polymer Polyol (R-8); Concentration of (d): 28%, Repetition: Twice

[First Step] Into a 1.5-liter pressure-resistant reaction container of a water-cooling jacket type, 395 parts of polyol (a1-1), 59 parts of acrylonitrile, 137 parts of styrene, 13.7 parts of 2.2-mole PO adduct of allyl alcohol, 0.59 part of divinyl benzene, 19.6 parts of the dispersant (e-1), and 63 parts of xylene were charged, and the temperature of the mixture was adjusted to 90° C. under agitation. 1.96 parts of the radical polymerization initiator (k-1) and 0.59 part of the radical polymerization initiator (k-2) were dissolved in 10 parts of xylene, and this solution was mixed with the foregoing mixture, so that polymerization was initiated. The polymerization proceeded quickly after the radical polymerization initiator solution was added, and aging was carried out for 10 minutes at the highest temperature of 160° C. while cooling was carried out also, whereby a polymer-containing polyol intermediate (C1-2) was obtained.

[Second Repetitive Step] Further, with use of (C1-2) as the base polymer polyol (r1-2), 43 parts of polyol (a1-1), 98 parts of acrylonitrile, 229 parts of styrene, 22.9 parts of 2.2-mole PO adduct of allyl alcohol, 0.98 part of divinyl benzene, 32.7 parts of the dispersant (e-1), and 25.6 parts of xylene were added to (r1-2), and the temperature of the mixture was adjusted to 90° C. under agitation. 1.96 parts of (k-1) and 0.98 part of (k-2) were dissolved in 12 parts of xylene, and this solution was mixed with the foregoing mixture, so that polymerization was initiated. The polymerization proceeded quickly after the radical polymerization initiator solution was added, and aging was carried out for 10 minutes at the highest temperature of 160° C. while cooling was carried out also, whereby a polymer-containing polyol intermediate (C2-2) was obtained. Non-reacted monomers and xylene were removed from (C2-2) by vacuum stripping at 2666 to 3999 Pa (20 to 30 torr) for two hours. As a result, a comparative polymer polyol (R-8) with a polymer content of 50%, a volume-average particle diameter of 0.85 µm, and a viscosity of 6200 mPa·s (25° C.) was obtained.

TABLE 3

| Polymer polyol | Ex. 7 Ia-1 | Ex. 8 Ia-2 | Ex. 9 Ia-3 | Ex.10 Ia-4 | Ex.11 Ia-5 | Ex.12 Ia-6 | Ex.13 Ia-7 |
|---|---|---|---|---|---|---|---|
| Styrene/acrylonitrile (wt %) | 70/30 | 70/30 | 70/30 | 70/30 | 70/30 | 70/30 | 50/50 |
| Concentration of (b) (mass %) | 25 | 21.5 | 11.0 | 16.0 | 12.0 | 21.5 | 23.8 |
| Repetition (Times) | 2 | 3 | 3 | 4 | 6 | 3 | 3 |
| Polymer content (mass %) | 40 | 50 | 30 | 50 | 50 | 50 | 50 |
| Arithmetic average particle diameter [R] (µm) | 0.46 | 0.54 | 0.38 | 0.56 | 0.52 | 0.58 | 0.34 |
| Arithmetic standard deviation of particle size distribution | 0.36 | 0.34 | 0.25 | 0.38 | 0.56 | 0.36 | 0.28 |
| Mode value [P] (vol %) | 10.9 | 13.0 | 11.8 | 12.0 | 14.1 | 12.6 | 12.2 |
| Largest particle diameter | 1.5 | 2.3 | 1.2 | 2.3 | 4.5 | 1.7 | 1.5 |

TABLE 3-continued

| Polymer polyol | Ex. 7 Ia-1 | Ex. 8 Ia-2 | Ex. 9 Ia-3 | Ex.10 Ia-4 | Ex.11 Ia-5 | Ex.12 Ia-6 | Ex.13 Ia-7 |
|---|---|---|---|---|---|---|---|
| Smallest particle diameter | 0.1 | 0.1 | 0.1 | 0.1 | 0.1 | 0.1 | 0.1 |
| [Q] | 1.4 | 2.2 | 1.1 | 2.2 | 4.4 | 1.6 | 1.4 |
| [P]/[Q] | 7.8 | 5.9 | 10.9 | 5.5 | 3.2 | 7.8 | 8.7 |
| $1.7 \times [R]^{-0.93}$ | 3.5 | 3.0 | 4.2 | 2.9 | 3.1 | 2.8 | 4.6 |
| Content of particles with diameter of 10 μm or more (vol %) | 0 | 0 | 0 | 0 | 0 | 0 | 0 |
| Viscosity (mPa·s) | 2,800 | 5,200 | 2,100 | 5,200 | 5,000 | 5,400 | 5,200 |
| 1st Conversion ratio (mass %) | 90 | 89 | 88 | 89 | 88 | 89 | 89 |
| Conversion rate (mass %/min) | 15 | 15 | 10 | 13 | 11 | 15 | 22 |
| 2nd Conversion ratio (mass %) | 94 | 92 | 91 | 91 | 89 | 92 | 92 |
| Conversion rate (mass %/min) | 15 | 15 | 10 | 13 | 11 | 15 | 22 |
| 3rd Conversion ratio (mass %) | — | 95 | 92 | 93 | 90 | 95 | 96 |
| Conversion rate (mass %/min) | — | 15 | 10 | 13 | 11 | 15 | 22 |
| 4th Conversion ratio (mass %) | — | — | — | 94 | 91 | — | — |
| Conversion rate (mass %/min) | — | — | — | 13 | 11 | — | — |
| 5th Conversion ratio (mass %) | — | — | — | — | 92 | — | — |
| Conversion rate (mass %/min) | — | — | — | — | 11 | — | — |
| 6th Conversion ratio (mass %) | — | — | — | — | 93 | — | — |
| Conversion rate (mass %/min) | — | — | — | — | 11 | — | — |

TABLE 4

| | Ex. 14 | Ex. 15 | Comp. Ex. 7 | Comp. Ex. 8 |
|---|---|---|---|---|
| Polymer polyol | Ia-8 | Ia-9 | R-7 | R-8 |
| Styrene/acrylonitrile (wt %) | 70/30 | 70/30 | 70/30 | 70/30 |
| Concentration of (b) in (A) (mass %) | 21.5 | 21.5 | 47.0 | 30.0 |
| Repetition (Times) | 3 | 3 | 1 | 2 |
| Polymer content (mass %) | 50 | 50 | 50 | 50 |
| Arithmetic average particle diameter (μm) | 0.54 | 0.54 | 2.80 | 1.60 |
| Arithmetic standard deviation | 0.34 | 0.34 | 0.82 | 0.75 |
| Mode value [P] (vol %) | 13.0 | 13.0 | 8.5 | 9.2 |
| Largest particle diameter | 2.3 | 2.3 | 28.0 | 16.5 |
| Smallest particle diameter | 0.1 | 0.1 | 0.1 | 0.1 |
| [Q] | 2.2 | 2.2 | 27.9 | 16.4 |
| [P]/[Q] | 5.9 | 5.9 | 0.30 | 0.56 |
| $1.7 \times [R]^{-0.93}$ | 3.0 | 3.0 | 0.65 | 1.09 |
| Content of particles with diameter of 10 μm or more (vol %) | 0 | 0 | 2.0 | 1 |
| Viscosity (mPa·s) | 4,900 | 5,400 | 10,800 | 6,200 |
| 1st Conversion ratio (mass %) | 88 | 90 | 95 | 89 |
| Conversion rate (mass %/min) | 14 | 15 | 15 | 6 |
| 2nd Conversion ratio (mass %) | 91 | 93 | — | 92 |
| Conversion rate (mass %/min) | 14 | 15 | — | 6 |
| 3rd Conversion ratio (mass %) | 94 | 96 | — | — |
| Conversion rate (mass %/min) | 14 | 15 | — | — |

EXAMPLES 16 TO 24 AND COMPARATIVE EXAMPLES 9 AND 10

Production of Polyurethane Foam

With use of the polymer polyols (Ia-1 to Ia-9) obtained in Examples 7 to 15 and the comparative polymer polyols (R-7 and R-8) obtained in Comparative Examples 7 and 8, polyurethane foams were produced by the foaming process below, at the mixing ratios shown in Tables 5 and 6. The properties of these foams are shown in Tables 5 and 6. The process for producing the foams was as follows:

(1) The temperatures of a polymer polyol, a mixture of a polyol (a1-1), and organic polyisocyanate were adjusted to 25±2° C.

(2) A polymer polyol, the polyol (a1-1), a foam stabilizer, water, and a catalyst were put into a stainless steel-made beaker of 1-liter volume in this order, and stirred and mixed at room temperature (25±2° C.). Immediately, organic polyisocyanate was added. Using an agitator (Homodisper; manufactured by TOKUSHU KIKA INDUSTRIES, Ltd.; stirring condition, 2000 rpm×8 seconds), the mixture was stirred, and foaming was carried out.

(3) After stopping stirring, the content was put into a wooden box (25° C.±2° C.) of 25×25×10 cm, and a polyurethane foam was obtained.

TABLE 5

| Polymer polyol | | Ex. 16 Ia-1 | Ex. 17 Ia-2 | Ex. 18 Ia-3 | Ex. 19 Ia-4 | Ex. 20 Ia-5 | Ex. 21 Ia-6 | Ex. 22 Ia-7 |
|---|---|---|---|---|---|---|---|---|
| Mixing Ratio | Polymer polyol | 68 | 55 | 92 | 55 | 55 | 55 | 55 |
| | Polyol (a1-1) | 32 | 45 | 8 | 45 | 45 | 45 | 45 |
| | Water | 2.8 | 2.8 | 2.8 | 2.8 | 2.8 | 2.8 | 2.8 |
| | Catalyst A | 0.06 | 0.06 | 0.06 | 0.06 | 0.06 | 0.06 | 0.06 |
| | Catalyst B | 0.18 | 0.18 | 0.18 | 0.18 | 0.18 | 0.18 | 0.18 |
| | SRX-280A | 0.53 | 0.53 | 0.53 | 0.53 | 0.53 | 0.53 | 0.53 |
| | TDI-80 | 34.2 | 34.2 | 34.2 | 34.2 | 34.2 | 34.2 | 34.2 |
| Foam Property | Density [kg/m$^3$] | 40 | 40 | 40 | 40 | 40 | 40 | 40 |
| | 25% ILD [kgf/314 cm$^2$] | 26.5 | 27.2 | 29.0 | 26.5 | 26.5 | 26.5 | 28.5 |
| | Tensile strength [kgf/cm$^2$] | 1.65 | 1.56 | 1.62 | 1.54 | 1.55 | 1.62 | 1.56 |
| | Tear strength [kgf/cm] | 0.85 | 0.87 | 0.86 | 0.84. | 0.86 | 0.87 | 0.86 |
| | Elongation at break [%] | 123 | 120 | 122 | 118 | 116 | 120 | 122 |
| | Compression set [%] | 2.3 | 2.1 | 2.0 | 2.2 | 2.1 | 2.1 | 2.1 |

TABLE 6

| | | Ex. 23 | Ex. 24 | Comp. Ex. 9 | Comp. Ex. 10 |
|---|---|---|---|---|---|
| Polymer polyol | | Ia-8 | Ia-9 | R-7 | R-8 |
| Mixing ratio | Polymer polyol | 55 | 55 | 55 | 55 |
| | Polyol (a1-1) | 45 | 45 | 45 | 45 |
| | Water | 2.8 | 2.8 | 2.8 | 2.8 |
| | Catalyst A | 0.06 | 0.06 | 0.06 | 0.06 |
| | Catalyst B | 0.18 | 0.18 | 0.18 | 0.18 |
| | SRX-280A | 0.53 | 0.53 | 0.53 | 0.53 |
| | TDI-80 | 34.2 | 34.2 | 34.2 | 34.2 |
| Foam property | Density [kg/m$^3$] | 37 | 37 | 37 | 40 |
| | 25% ILD [kgf/314 cm$^2$] | 26.5 | 27.8 | 23.6 | 23.3 |
| | Tensile strength [kgf/cm$^2$] | 1.56 | 1.56 | 1.16 | 1.38 |
| | Tear strength [kgf/cm] | 0.88 | 0.86 | 0.62 | 0.63 |
| | Elongation at break [%] | 125 | 115 | 90 | 96 |
| | Compression set [%] | 2.1 | 2.1 | 2.5 | 2.4 |

As seen from the results shown in Tables 3 and 4, polymer polyols of Examples 7 to 15 had smaller particle diameters of polymer particles therein, and had lower viscosities, as compared with polymer polyols of Comparative Examples 7 and 8. As seen from the results shown in Tables 5 and 6, the polyurethane foams of Examples 16 to 25 were significantly excellent in 25% ILD, tensile strength, tear strength, and elongation at break, and exhibited improvement regarding compression set, as compared with the polyurethane foams of Comparative Examples 9 and 10.

It should be noted that Example 7 and the subsequent examples are described as examples according to the inventions [3] to [5], but any one of the same also serves as an example of the invention [1] or [2].

INDUSTRIAL APPLICABILITY

A polyurethane resin produced by using a polyol composition of the present invention or a polymer polyol obtained by a method of the present invention can be used for various applications in which a polyurethane resin is used usually; particularly, the foregoing polyurethane resin is preferably used as a polyurethane foam so as to be applied in interior parts of automobiles, interior products, furniture, and the like. Thus, the polyol composition of the present invention or the polymer polyol obtained by the method of the present invention is useful as a material for forming a polyurethane resin and a polyurethane foam.

The invention claimed is:

1. A method for producing a polymer polyol (Ia), the method comprising:
a first step of polymerizing a monomer-containing mixture liquid (A1) comprising a polyol (a), an ethylenically unsaturated monomer (d), a radical polymerization initiator (k), and a dispersant (e), thereby obtaining a polymer polyol intermediate (B1); and
an (i+1)th step of polymerizing a monomer-containing mixture liquid (Ai+1) comprising a polyol (a), an ethylenically unsaturated monomer (d), a radical polymerization initiator (k), a dispersant (e), and a base polymer polyol (hi) that is an intermediate (Bi), thereby obtaining a polymer polyol intermediate (Bi+1), where i is an integer incremented from 1 to n−1 whereby this step is repeated n−1 times, wherein the polymer polyol intermediate (Bi+1) is to be used as a base polymer polyol (hi+1) in a next step whereby the ethylenically unsaturated monomer (d) is polymerized likewise,
wherein
a total number n of repetition times is 3 to 7,
each of the steps of the polymerizing the monomer-containing mixture liquid (A1) and the monomer-containing mixture liquid (Ai+1) is a one-step polymerization method, in which a mixture obtained by mixing (a), (d), (e), and optionally a diluent (c) is heated to a polymerization temperature and thereafter the radical polymerization initiator (k) is added to the mixture for polymerization,
each concentration of the ethylenically unsaturated monomer (d) in the monomer-containing mixture liquids (A1) and (Ai+1) before the initiation of polymerization in each step is 7 mass % to 25 mass %,
a polymer content in the base polymer polyol (hi) is 7 mass % to 50 mass %, and
a polymer content in a polymer polyol (Ia) obtained finally is 30 mass % to 65 mass %.

2. The method according to claim 1, wherein
a conversion ratio of the ethylenically unsaturated monomer (d) to a polymer in each step is not less than 80 mass %, and
a conversion rate of the ethylenically unsaturated monomer (d) into a polymer from initiation of the polymerization until the conversion ratio becomes 80 mass % in each step is not less than 8 mass %/min.

3. The method according to claim 1, wherein in a particle size distribution by volume of polymer particles in the polymer polyol (Ia), derived from respective values in 85 divisions of a range of 0.020 to 2000 μm determined by a laser diffraction/scattering particle size distribution analyzer, a content of particles having a diameter of not less than 10 μm in the polymer particles is not more than 2 vol %.

4. The method according to claim 1, wherein in a particle size distribution of the polymer particles in the polymer polyol (Ia), derived from respective values in 85 divisions of a range of 0.020 to 2000 μm determined by a laser diffraction/scattering particle size distribution analyzer, an arithmetic standard deviation by volume of the polymer particles is not more than 0.6.

5. The method according to claim 1, wherein a content of polyoxyalkylene ether in α-alkyenyl-group-containing compound in the ethylenically unsaturated monomer (d) is 2 mass % to 15 mass %.

6. A method for producing a polyurethane resin, comprising the step of causing a polyol component and a polyisocyanate component to react, in the presence of one or more additives selected from a catalyst, a blowing agent, and a foam stabilizer as required, wherein the polymer polyol (Ia) obtained by the method according to claim 1 is used as at least a part of the polyol component.

* * * * *